(12) United States Patent
Park et al.

(10) Patent No.: US 12,273,817 B2
(45) Date of Patent: Apr. 8, 2025

(54) METHOD AND DEVICE FOR ENTERING SLEEP MODE BY TERMINAL IN NR V2X

(71) Applicant: LG Electronics Inc., Seoul (KR)

(72) Inventors: Giwon Park, Seoul (KR); Seoyoung Back, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 17/912,433

(22) PCT Filed: Mar. 10, 2021

(86) PCT No.: PCT/KR2021/002955
§ 371 (c)(1),
(2) Date: Sep. 16, 2022

(87) PCT Pub. No.: WO2021/187797
PCT Pub. Date: Sep. 23, 2021

(65) Prior Publication Data
US 2023/0156602 A1 May 18, 2023

(30) Foreign Application Priority Data
Mar. 17, 2020 (KR) .......................... 10-2020-0032397

(51) Int. Cl.
*H04W 52/02* (2009.01)
*H04L 1/1829* (2023.01)
(Continued)

(52) U.S. Cl.
CPC ....... *H04W 52/0235* (2013.01); *H04L 1/1854* (2013.01); *H04W 72/20* (2023.01); *H04W 76/28* (2018.02); *H04L 1/1812* (2013.01)

(58) Field of Classification Search
CPC . H04W 52/0235; H04W 72/20; H04W 76/28; H04W 72/25; H04W 4/40;
(Continued)

(56) References Cited

U.S. PATENT DOCUMENTS

2019/0363843 A1* 11/2019 Gordaychik ........ H04W 72/044
2020/0351032 A1* 11/2020 Wu ........................ H04W 72/20
(Continued)

FOREIGN PATENT DOCUMENTS

WO WO 2018199652 11/2018

OTHER PUBLICATIONS

Fujitsu, "Discussion on physical layer procedure for NR V2X," 3GPP TSG RAN WG1 #99, R1-1912082, Reno, USA, Nov. 18-22, 2019, 7 pages.
(Continued)

*Primary Examiner* — Abdullahi Ahmed
(74) *Attorney, Agent, or Firm* — Fish & Richardson P.C.

(57) ABSTRACT

Proposed is a method for performing wireless communication by a first device. The method may comprise the steps of: receiving a physical sidelink control channel (PSCCH) from a second device; receiving a physical sidelink shared channel (PSSCH) related to the PSCCH from the second device, wherein sidelink control information (SCI) is received via the PSCCH or the PSSCH related to the PSCCH, and the SCI includes information indicating whether the PSSCH corresponds to last PSSCH transmission: determining a PSFCH resource on the basis of a slot index and a subchannel index which are related to the PSSCH: transmitting SL HARQ ACK information to the second device via the PSFCH resource; and entering a sleep state on the basis that the SCI includes information indicating that the PSSCH
(Continued)

corresponds to the last PSSCH transmission, and the first device transmits the SL HARQ ACK information via the PSFCH resource.

20 Claims, 25 Drawing Sheets

(51) Int. Cl.
*H04W 72/20* (2023.01)
*H04W 76/28* (2018.01)
*H04L 1/1812* (2023.01)

(58) Field of Classification Search
CPC ......... H04W 52/0216; H04W 52/0229; H04W 76/14; H04W 52/02; H04W 52/0261; H04W 52/0225; H04W 72/0446; H04W 92/18; H04L 1/1854; H04L 1/1812; H04L 1/1825; H04L 1/1848; H04L 1/1896; Y02D 30/70
See application file for complete search history.

(56) References Cited

U.S. PATENT DOCUMENTS

| | | | | |
|---|---|---|---|---|
| 2022/0321191 | A1* | 10/2022 | Kim | ........................ H04L 1/1867 |
| 2022/0353815 | A1* | 11/2022 | Lin | .................... H04W 52/0232 |
| 2023/0006775 | A1* | 1/2023 | Lee | ........................ H04L 1/1858 |
| 2023/0148141 | A1* | 5/2023 | Hu | .................... H04W 74/0808 |
| | | | | 370/329 |
| 2024/0275527 | A1* | 8/2024 | Park | ........................ H04W 76/14 |

OTHER PUBLICATIONS

Sharp, "Remaining issues on physical layer structure for NR sidelink," 3GPP TSG RAN WG1 Meeting #100-e, R1-2000876, e-Meeting, Feb. 24-Mar. 6, 2020, 6 pages.

Vivo, "Remaining issues on mode 1 resource allocation mechanism," 3GPP TSG RAN WG1 #100, R1-2000316, e-Meeting, Feb. 24-Mar. 6, 2020, 17 pages.

* cited by examiner

FIG. 4
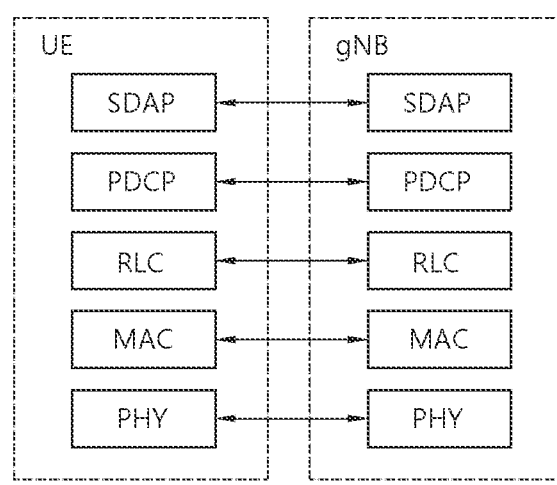
(a)
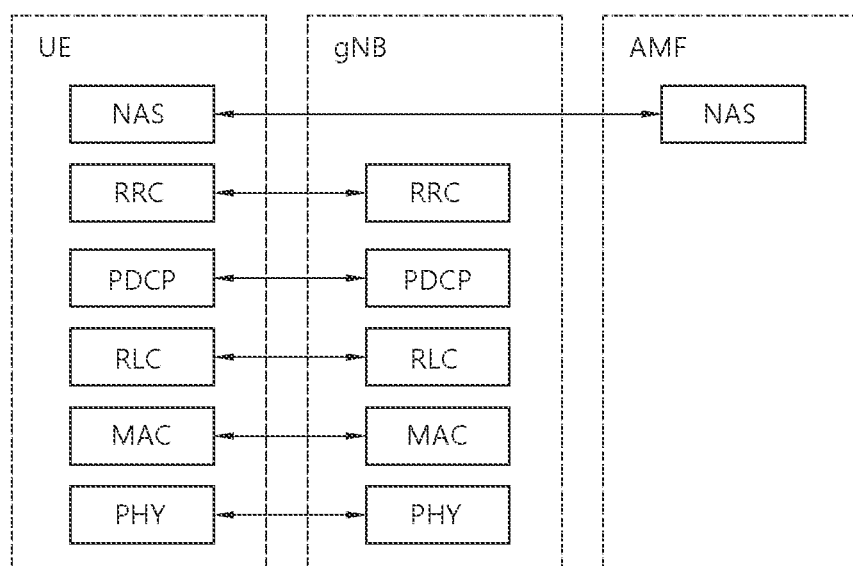
(b)

FIG. 8
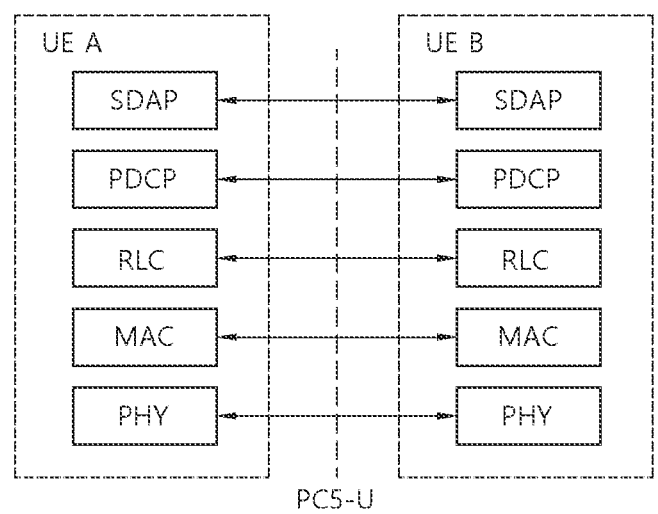
(a)
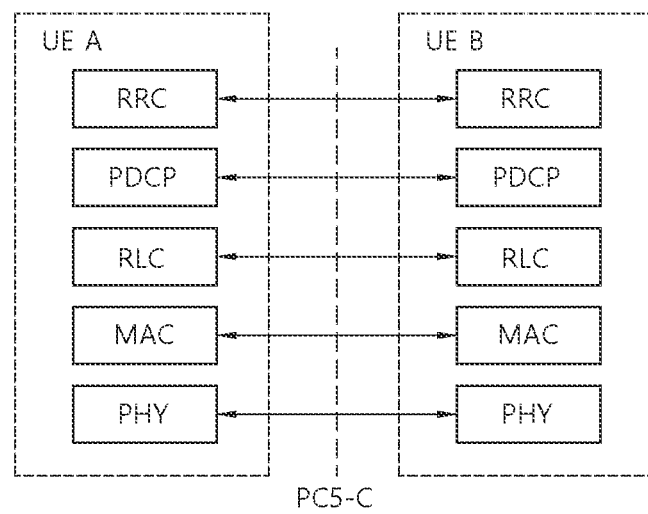
(b)

METHOD AND DEVICE FOR ENTERING SLEEP MODE BY TERMINAL IN NR V2X

CROSS-REFERENCE TO RELATED APPLICATIONS

This application is a National Stage application under 35 U.S.C. § 371 of International Application No. PCT/KR2021/002955, filed on Mar. 10, 2021, which claims the benefit of Korean Patent Application No. 10-2020-0032397, filed on Mar. 17, 2020. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X communication or NR sidelink communication, according to the conventional power saving technology, a user equipment (UE) should keep an active state for a predetermined time in order to continuously receive a message transmitted by a base station if the UE receives a downlink message from the base station. Also, for example, if the UE transmits an uplink message to the base station, the UE should keep an active state for a predetermined time. For example, the UE should keep an active state for transmitting an uplink message to the base station or receiving a downlink message from the base station during a discontinuous reception (DRX) on-duration period. Also, for example, the UE should keep an active state for transmitting an uplink message to the base station or receiving a downlink message from the base station while an DRX inactivity timer is running.

Technical Solutions

In one embodiment, a method for performing wireless communication by a first device is provided. The method may comprise: receiving, from a second device, a physical sidelink control channel (PSCCH); receiving, from the second device, a physical sidelink shared channel (PSSCH) related to the PSCCH, wherein sidelink control information (SCI) is received through the PSCCH or the PSSCH related to the PSCCH, and wherein the SCI includes information representing whether the PSSCH is a last PSSCH transmission; determining a PSFCH resource based on an index of a slot and an index of a sub-channel related to the PSSCH: transmitting, to the second device, SL HARQ ACK information through the PSFCH resource; and entering a sleep state, based on the SCI including information representing that the PSSCH is the last PSSCH transmission and the SL HARQ ACK information being transmitted through the PSFCH resource by the first device.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
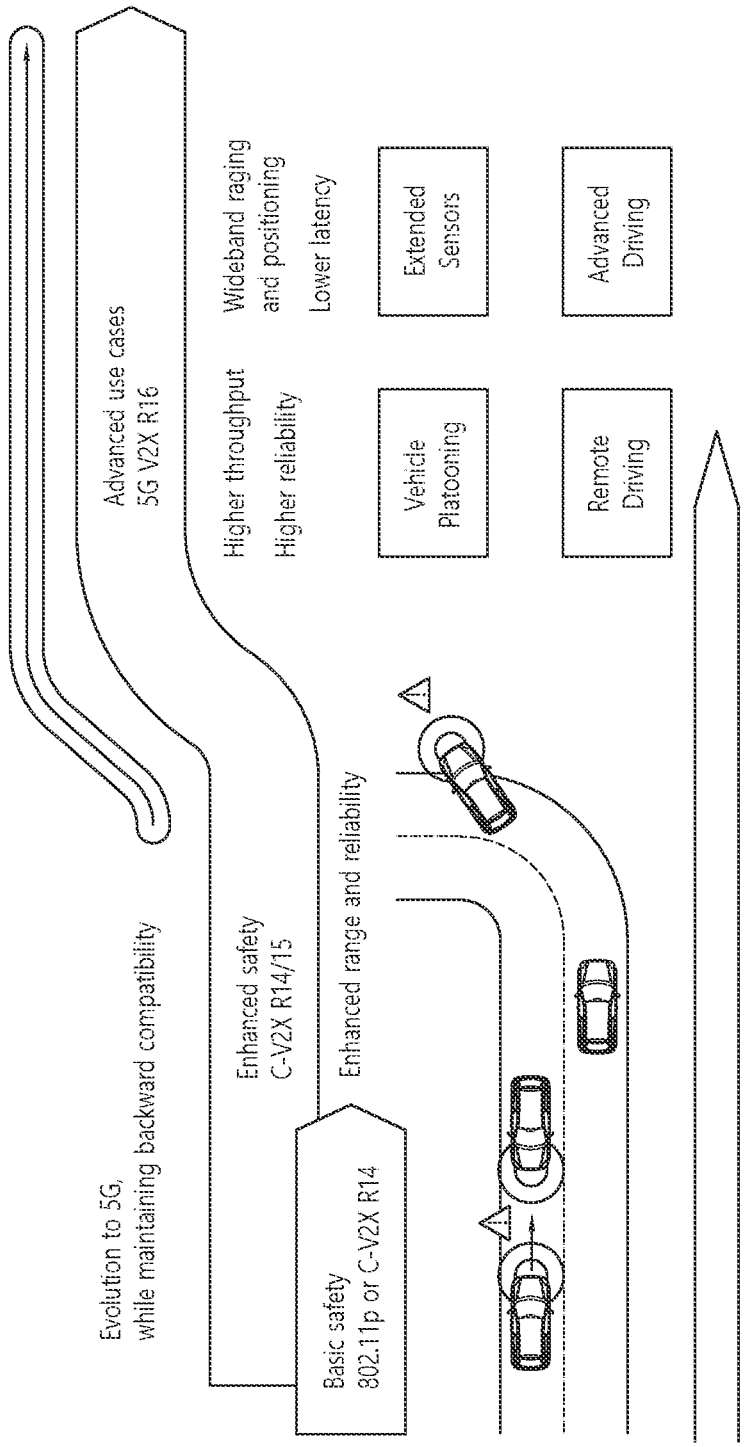
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or" For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
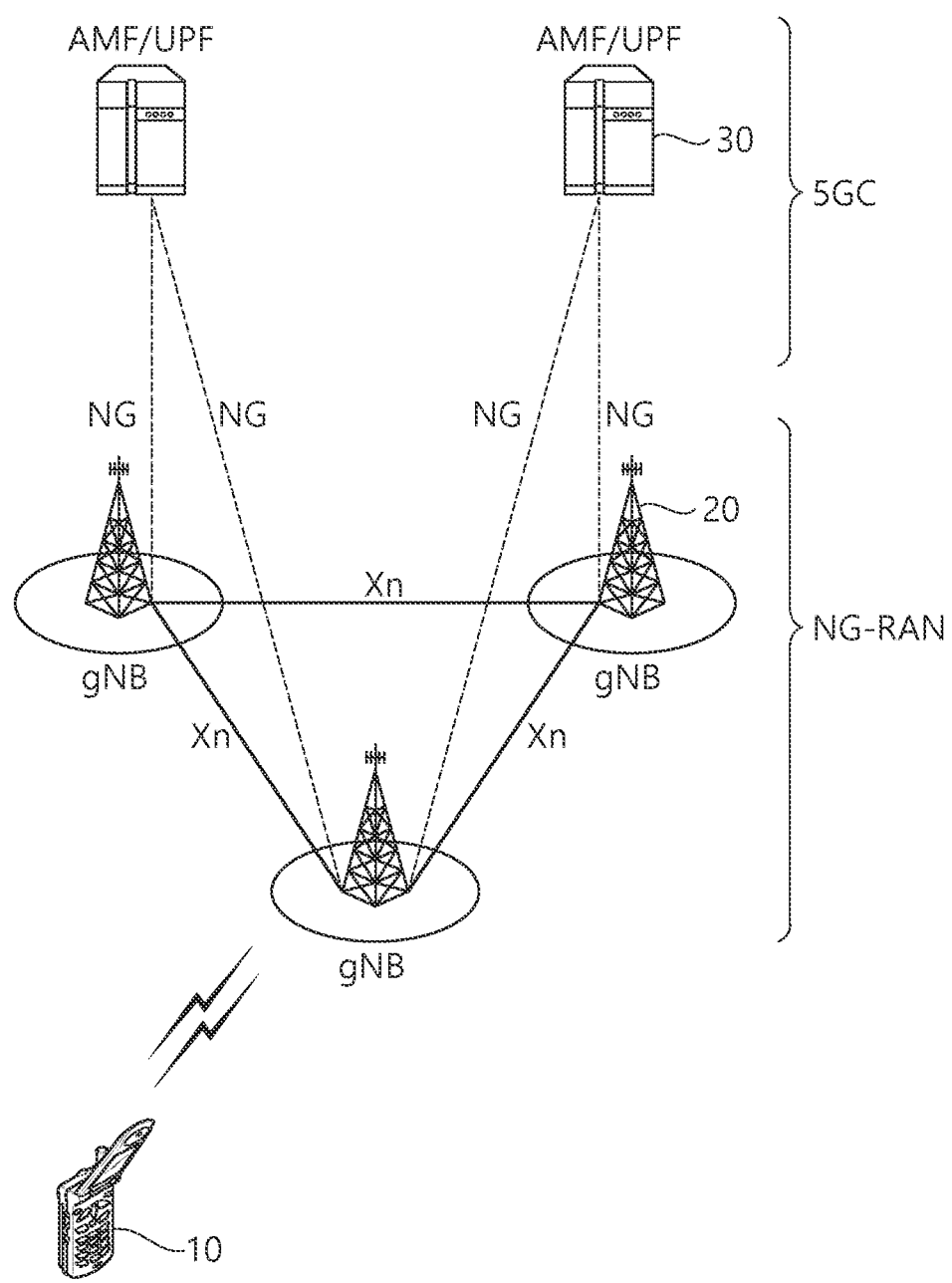
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
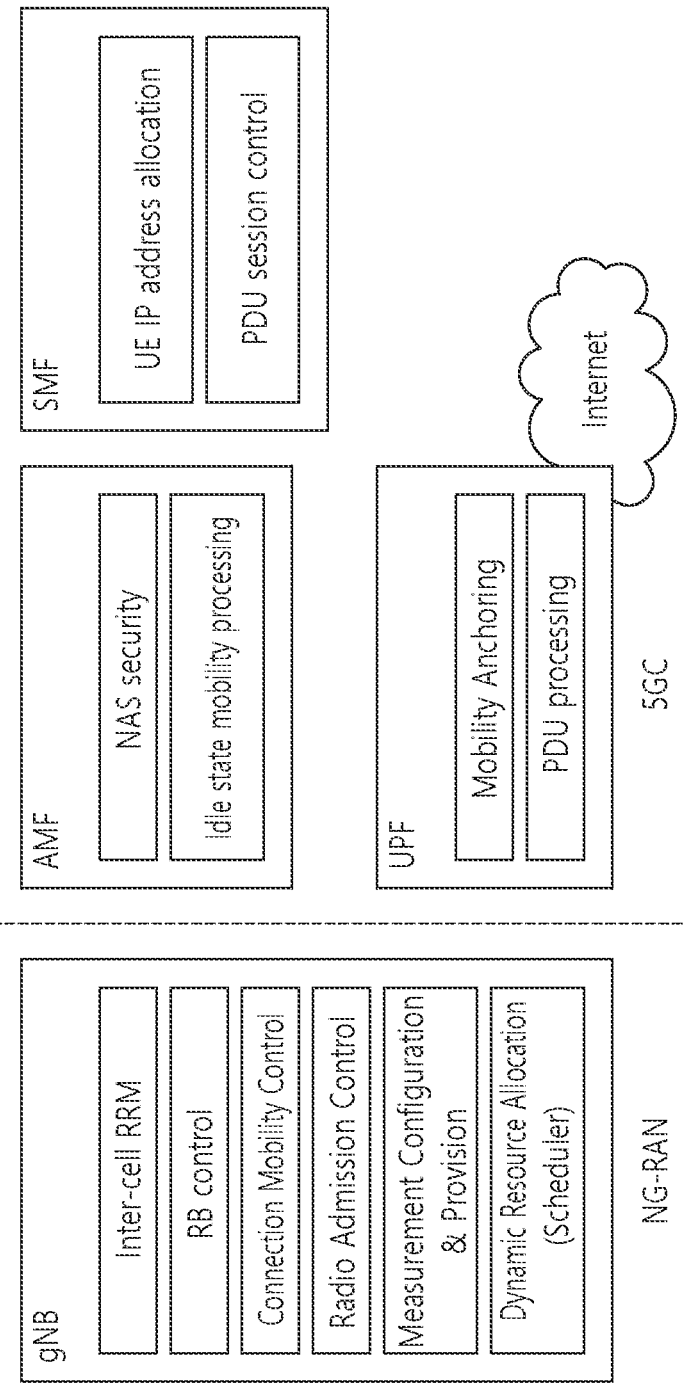
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC laver also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
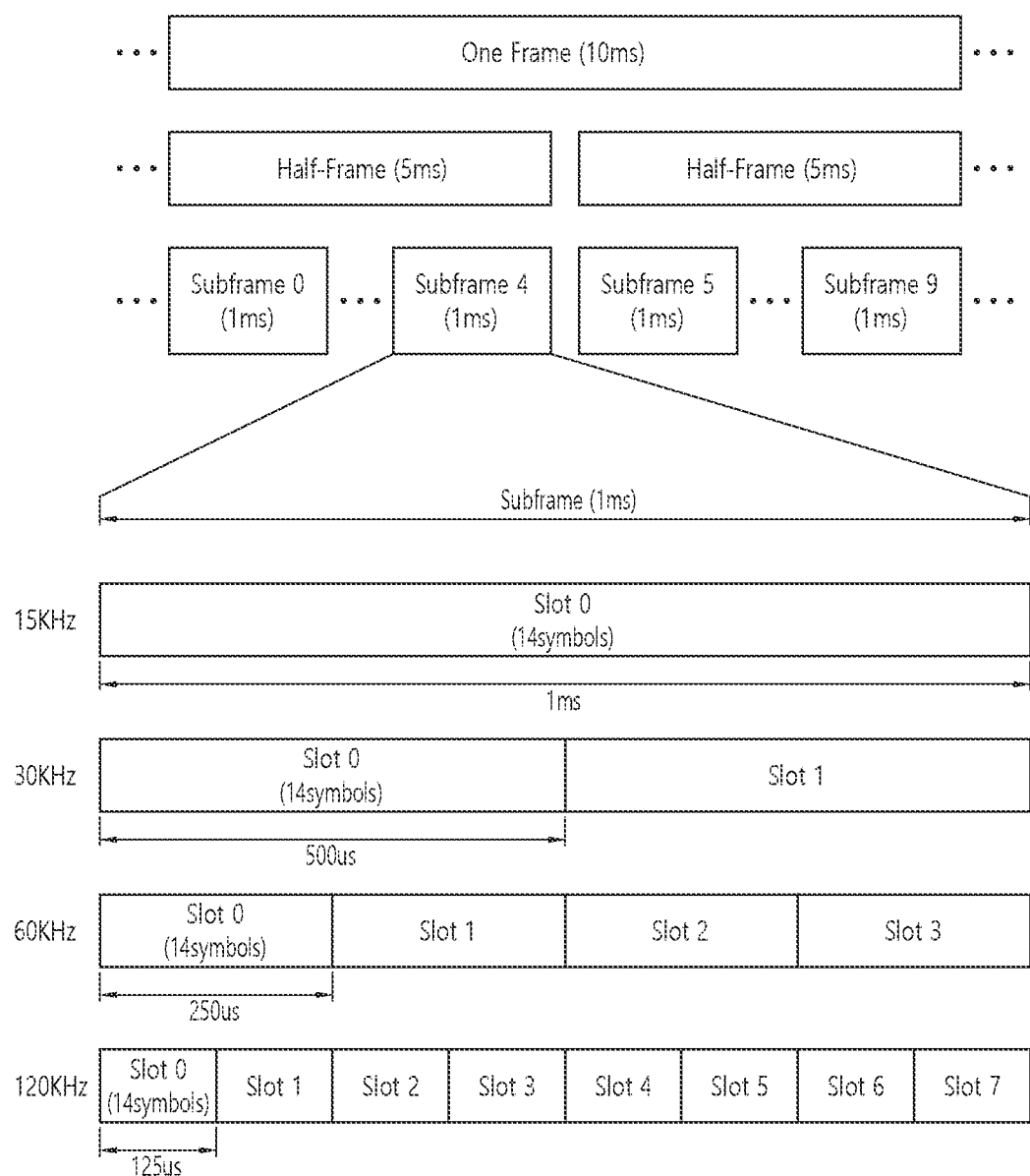
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * 2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * 2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range" and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHZ | 15, 30, 60 kHz |
| FR2 | 24250 MHz-52600 MHZ | 60, 120, 240 kHz |

Figure 6:
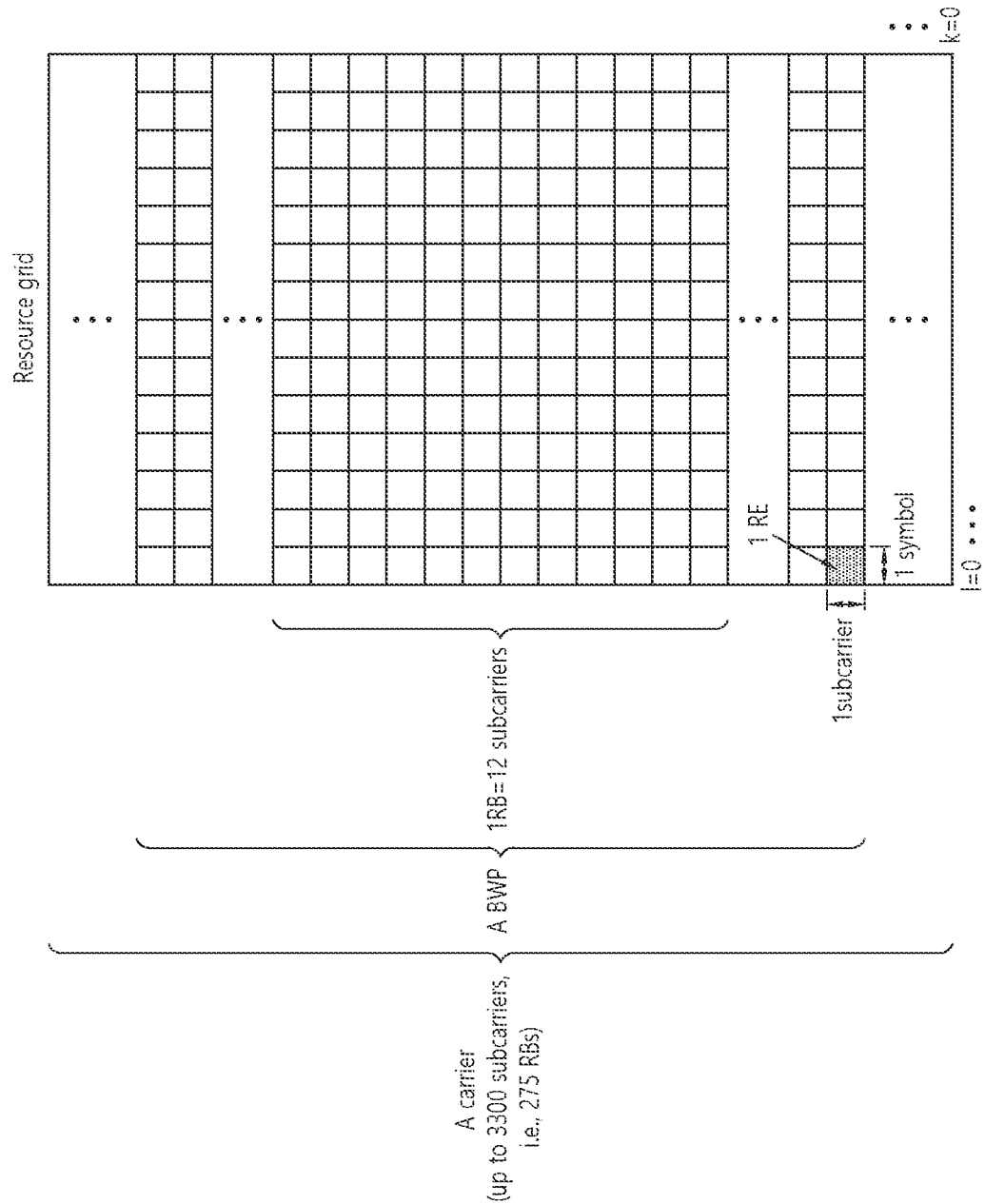
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
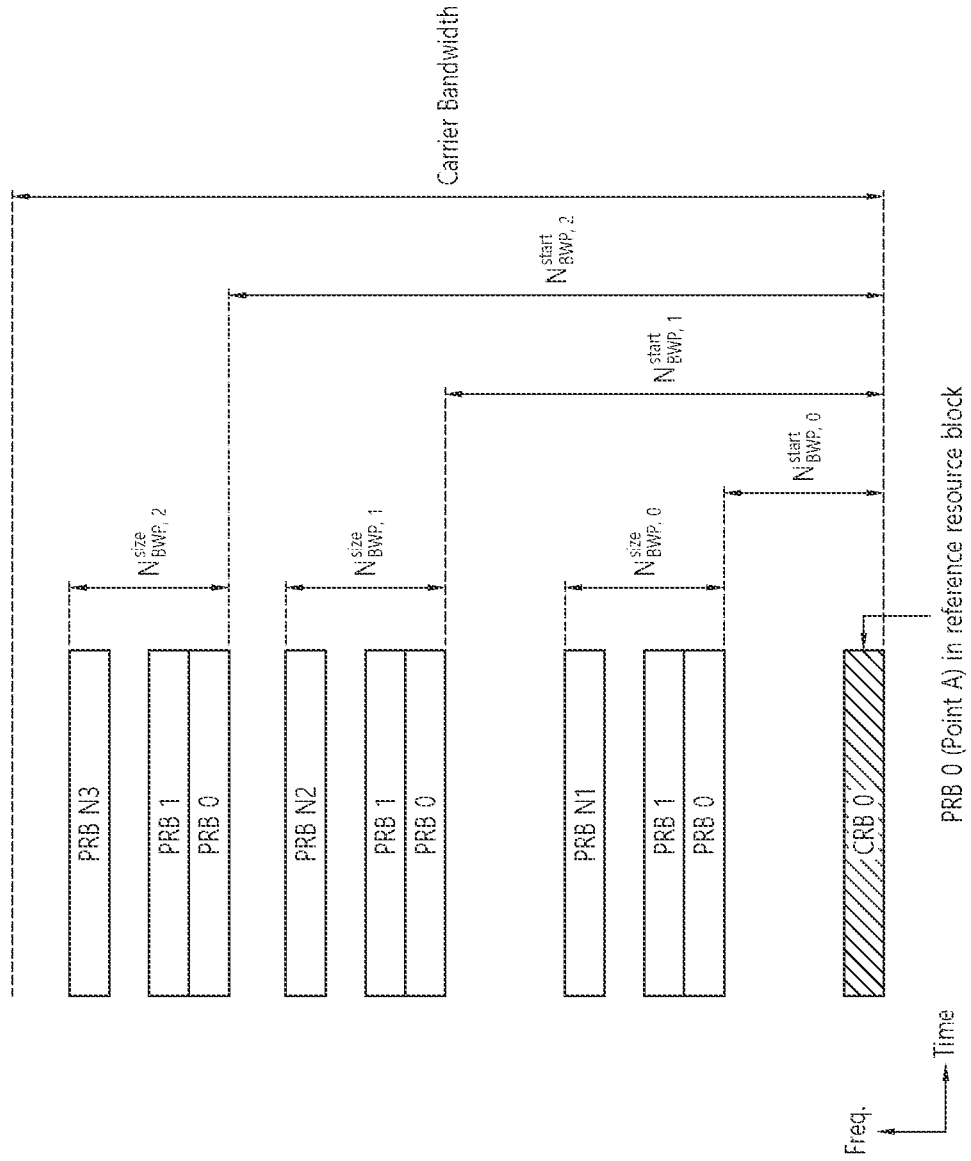
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A. and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information ill be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e.. SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
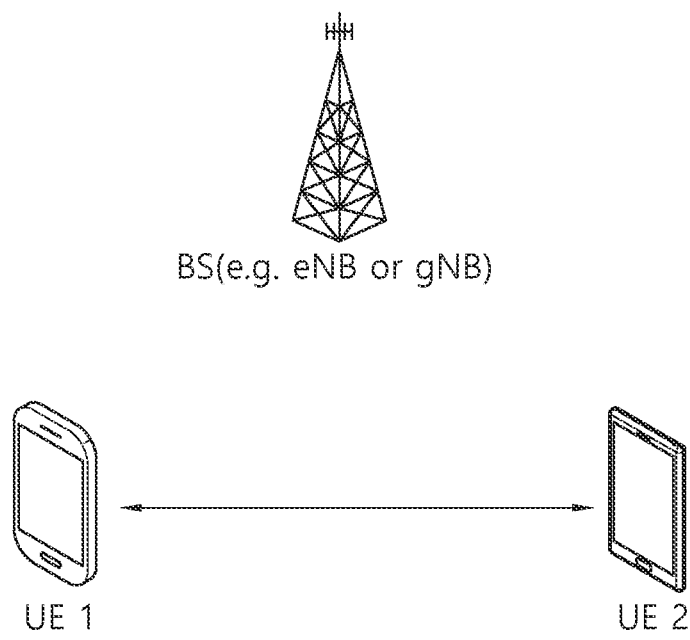
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
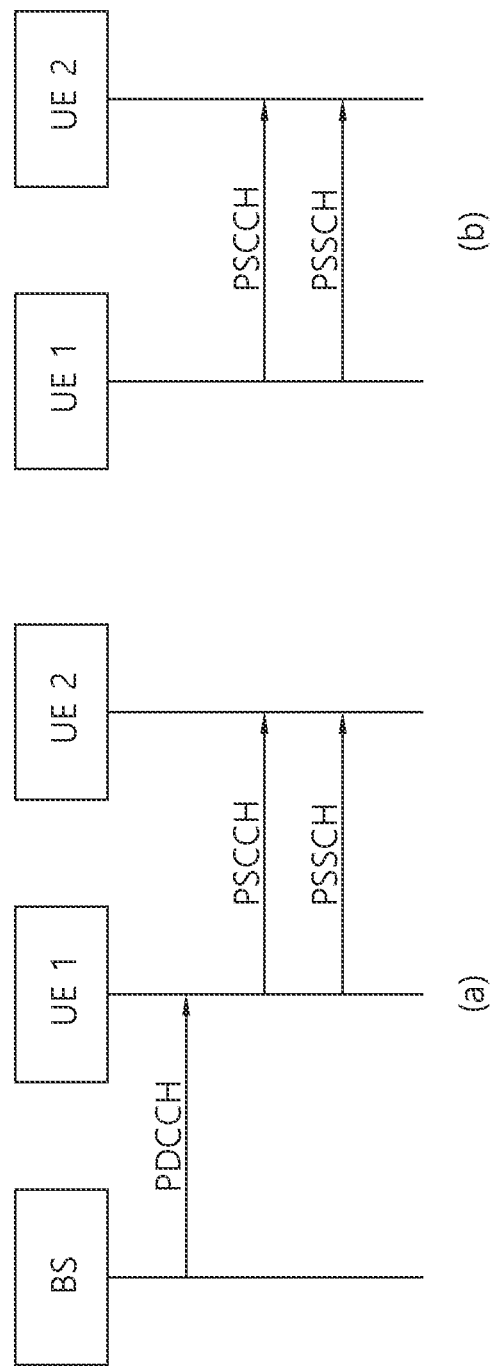
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example. FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
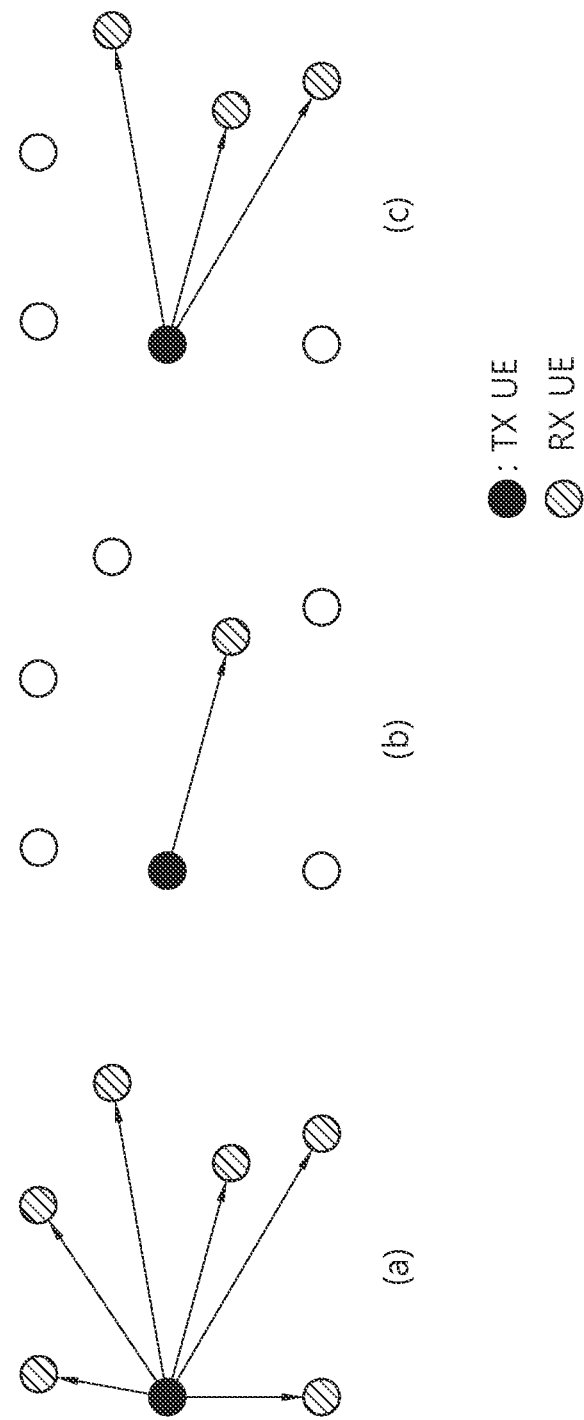
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically. FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH. NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g.. SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, in the conventional NR V2X, the power saving operation of the UE was not supported, but in the recent NR V2X, the power saving operation of the UE can be supported. For example, the power saving operation of the UE was not supported in Release 16 NR V2X, but the power saving operation of the UE can be supported from Release 17 NR V2X.

For example, according to the conventional power saving technology, if the UE receives a downlink message from the base station, the UE should keep an active state for a predetermined time in order to continuously receive a message transmitted by the base station. Also, for example, if the UE transmits an uplink message to the base station, the UE should keep the active state for a predetermined time. For example, the UE should keep the active state for transmitting an uplink message to the base station or receiving a downlink message from the base station during a discontinuous reception (DRX) on-duration period. Also, for example, the UE should keep the active state for transmitting an uplink message to the base station or receiving a downlink message from the base station while a DRX inactivity timer is running.

Hereinafter, in the present disclosure, in NR V2X, provided is a method in which the receiving UE does not keep an active state for a predetermined time and immediately transits to a sleep mode, in order to reduce power consumption, if specific condition(s) is satisfied after the receiving UE receives sidelink traffic from the transmitting UE. For example, the active state may be referred to as the awake state or the active mode, and the sleep state may be referred to as the sleep mode.

Based on various embodiments of the present disclosure, the UE may operate based on the following sidelink DRX configuration.

For example. SL drx-onDurationTimer may be a parameter for the duration at the beginning of a DRX cycle. For example, the beginning of the DRX cycle may be a parameter for the duration in which the UE operates in an active mode to transmit or receive sidelink data.

For example, SL drx-SlotOffset may be a parameter for the delay before starting the drx-onDurationTimer of the DRX-onduration timer.

For example, SL drx-InactivityTimer may be a parameter for the duration after the PSCCH occasion in which a PSCCH indicates a new sidelink transmission and reception for the MAC entity. For example, if the transmitting UE indicates PSSCH transmission through PSCCH, the transmitting UE may operate in an active mode while SL drx-InactivityTimer is running, and the transmitting UE can transmit PSSCH to the receiving UE. Also, for example, if the receiving UE is indicated through PSCCH reception that the transmitting UE transmits PSSCH, the receiving UE may operate in an active mode while SL drx-InactivityTimer is running, and the receiving UE can receive PSSCH from the transmitting UE.

For example, SL drx-LongCycleStartOffset may be a parameter for along DRX cycle and DRX-StartOffset defining a subframe in which a long DRX cycle and a short DRX cycle start.

For example, SL drx-ShortCycle may be a parameter for a short DRX cycle. For example, SL drx-ShortCycle may be an optional parameter.

For example, SL drx-ShortCycleTimer may be a parameter for the duration in which the UE follows a short DRX cycle. For example, SL drx-ShortCycleTimer may be an optional parameter.

Based on an embodiment of the present disclosure, if the receiving UE receives the last sidelink data from the transmitting UE, and the receiving UE transmits HARQ ACK for the last sidelink data to the transmitting UE, the receiving UE may not remain in an active mode in the remaining on-duration period of sidelink DRX. That is, for example, the receiving UE may transmit HARQ ACK for the last sidelink data to the transmitting UE and immediately transit to a sleep mode to reduce power consumption.

The present disclosure describes a method in which the receiving UE can transit to an early sleep mode in a sidelink on-duration period.

Based on an embodiment of the present disclosure, the transmitting UE may indicate/represent that sidelink data corresponds to the last sidelink data w % ben transmitting the sidelink data to the receiving UE. For example, the sidelink data may include a sidelink PDU.

The transmitting UE may transmit a field indicating/representing whether sidelink data is the last sidelink data to the receiving UE through a PSCCH. For example, the PSCCH may be a PSCCH related to a PSSCH for transmitting the last sidelink data. For example, the transmitting UE may transmit SCI to the receiving UE through the PSCCH. Herein, for example, the SCI may be 1st SCI or 2nd SCI. For example, the SCI may include the field indicating/representing whether sidelink data is the last sidelink data. For example, the field indicating/representing whether sidelink data is the last sidelink data may be a new field or a field that replace/convert all or part of the existing field. That is, for example, the receiving UE may check the field value indicating/representing whether sidelink data is the last sidelink data through the PSCCH. The receiving UE may distinguish whether the PSSCH transmitted by the transmitting UE is the last sidelink data based on the field value indicating/representing whether sidelink data is the last sidelink data. For example, if the field value indicating/representing whether sidelink data is the last sidelink data in the PSCCH (e.g., SCI) is 0, the receiving UE may determine that the PSSCH transmitted by the transmitting UE does not correspond to the last sidelink data. Or, for example, if the field value indicating/representing whether sidelink data is the last sidelink data in the PSCCH (e.g., SCI) is 1, the receiving UE may determine that the PSSCH transmitted by the transmitting UE corresponds to the last sidelink data.

Or, the transmitting UE may transmit a field indicating/representing whether sidelink data is the last sidelink data to the receiving UE through a sidelink MAC subheader related to the PSSCH. That is, for example, the receiving UE may check the field value indicating/representing whether sidelink data is the last sidelink data through the sidelink MAC subheader on the PSSCH received from the transmitting UE. The receiving UE may distinguish whether the PSSCH transmitted by the transmitting UE is the last sidelink data based on the field value indicating/representing whether sidelink data is the last sidelink data. For example, if the field value indicating/representing whether sidelink data is the last sidelink data in the sidelink MAC subheader is 0, the receiving UE may determine that the PSSCH transmitted by the transmitting UE does not correspond to the last sidelink data. Or, for example, if the field value indicating/representing whether sidelink data is the last sidelink data in the sidelink MAC subheader is 1, the receiving UE may determine that the PSSCH transmitted by the transmitting UE corresponds to the last sidelink data.

For example, a sidelink DRX command MAC CE may include a field indicating/representing whether sidelink data is the last sidelink data. Herein, for example, the sidelink DRX command MAC CE may be a sidelink MAC CE used for stopping a timer related to a currently SL DRX operation and transiting to a sleep mode. That is, for example, the receiving UE may check the field value indicating/representing whether sidelink data is the last sidelink data through the sidelink DRX command MAC CE received from the transmitting UE. The receiving UE may distinguish whether the PSSCH transmitted by the transmitting UE is the last sidelink data based on the field value indicating/representing whether sidelink data is the last sidelink data. For example, if the field value indicating/representing whether sidelink data is the last sidelink data in the sidelink DRX command MAC CE is 0, the receiving UE may determine that the PSSCH transmitted by the transmitting UE does not correspond to the last sidelink data. Or, for example, if the field value indicating/representing whether sidelink data is the last sidelink data in the sidelink DRX command MAC CE is 1, the receiving UE may determine that the PSSCH transmitted by the transmitting UE corresponds to the last sidelink data.

In combination with the above-described embodiment(s), the receiving UE may perform the sidelink DRX operation. That is, for example, the receiving UE may determine whether the received PSSCH is the last sidelink data, based on the field value indicating/representing whether sidelink data is the last sidelink data in the PSCCH (e.g., SCI) or the field value indicating/representing whether sidelink data is the last sidelink data in the PSSCH (e.g., sidelink MAC subheader) received from the transmitting UE. Thereafter, if the receiving UE transmits SL HARQ ACK for the PSSCH to the transmitting UE, the receiving UE may not remain in an active mode in the remaining on-duration period of sidelink DRX, and the receiving UE may transit to an early sleep mode. Also, for example, if an SL DRX-inactivity timer of the receiving UE is running, the receiving UE may stop the remaining SL DRX-inactivity timer immediately after transmitting SL HARQ ACK for the last sidelink data to the transmitting UE. That is, the receiving UE may stop the SL DRX-inactivity timer and transit to a sleep mode. Or, for example, if an SL DRX-onduration timer of the receiving UE is running, the receiving UE may stop the remaining SL DRX-onduration timer immediately after transmitting SL HARQ ACK for the last sidelink data to the transmitting UE. That is, the receiving UE may stop the SL DRX-onduration timer and transit to a sleep mode. Or, for example, if an SL DRX-retransmission timer of the receiving UE is running, the receiving UE may stop the remaining SL DRX-retransmission timer immediately after transmitting SL HARQ ACK for the last sidelink data to the transmitting UE. That is, the receiving UE may stop the SL DRX-retransmission timer and transit to a sleep mode.

For example, the receiving UE can reduce power consumption by transiting to an early sleep mode even if there is the remaining active mode duration. That is, for example, even if there is the duration in which the receiving UE needs to monitor sidelink traffic transmitted by the transmitting UE, the receiving UE can reduce power consumption by transiting to an early sleep mode.

Meanwhile, in the case of sidelink data for which HARQ feedback is disabled, the transmitting UE may indicate that sidelink data is the last sidelink data to the receiving UE, and the transmitting UE may transmit the last sidelink data to the receiving UE. In this case, the receiving UE may not be able to transmit SL HARQ feedback to the transmitting UE even after receiving the last sidelink data from the transmitting UE. That is, for example, if the field value indicating/representing whether sidelink data is the last sidelink data is set to 1 in order to indicate/represent that sidelink data (e.g., PSSCH) is the last sidelink data, and the HARQ feedback option for the last sidelink data (e.g., PSSCH) is set to HARQ feedback disabled, the receiving UE may not be able to transmit SL HARQ ACK to the transmitting UE even if the receiving UE succeeds in decoding the last sidelink data (e.g., PSSCH) received from the transmitting UE.

In this case, based on an embodiment of the present disclosure, even if the receiving UE does not transmit SL HARQ feedback for the last sidelink data to the transmitting UE, if the receiving UE receives the last sidelink data from the transmitting UE, the receiving UE may immediately transit from an active mode to an early sleep mode in the remaining on-duration period of sidelink DRX.

In addition, for example, if an SL DRX inactivity timer is running and the receiving UE receives the last sidelink data from the transmitting UE, the receiving UE may immediately stop the remaining SL DRX inactivity timer and transit to a sleep mode even if the receiving UE does not transmit SL HARQ feedback to the transmitting UE. That is, the receiving UE can reduce power consumption by transiting to an early sleep mode even if there is the remaining active mode duration. For example, even if there is the duration in which the receiving UE needs to monitor sidelink traffic transmitted by the transmitting UE, the receiving UE can reduce power consumption by transiting to an early sleep mode.

Figure 12:
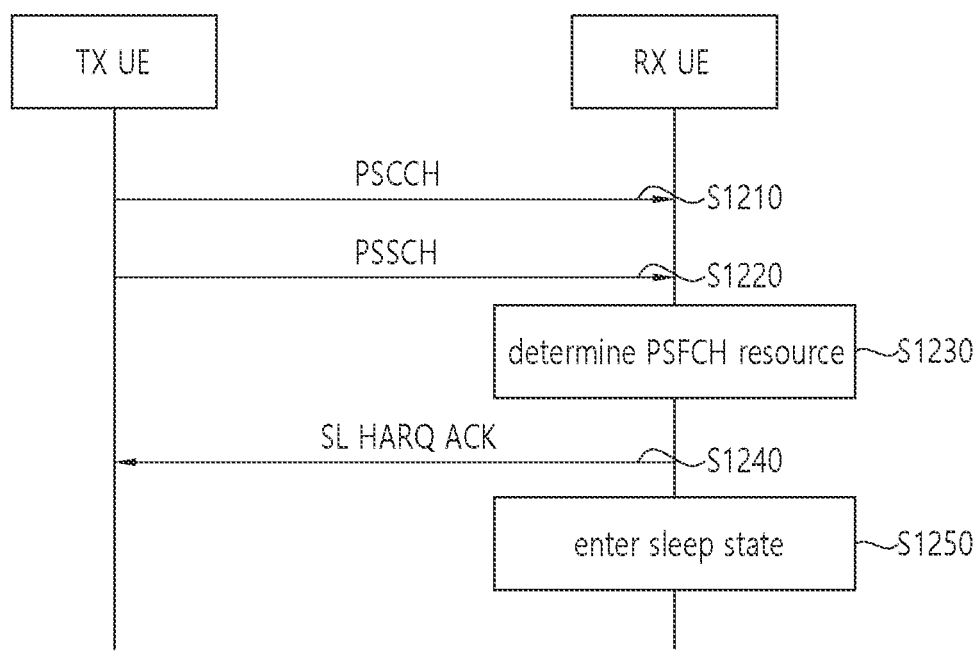
FIG. 12 shows a procedure for a receiving UE to enter an early sleep state if HARQ feedback is enabled, based on an embodiment of the present disclosure.

FIG. 12 shows a procedure for a receiving UE to enter an early sleep state if HARQ feedback is enabled, based on an embodiment of the present disclosure. The embodiment of FIG. 12 may be combined with various embodiments of the present disclosure.

Referring to FIG. 12, in step S1210, the transmitting UE may transmit a PSCCH to the receiving UE. For example, the receiving UE may receive the PSCCH from the transmitting UE based on an active state. For example, the active state may be a state in which the UE consumes power for monitoring traffic related to sidelink communication. For example, a sleep state may be a state in which the UE does not perform the monitoring by interrupting power related to the monitoring. For example, the receiving UE may receive SCI through the PSCCH or a PSSCH related to the PSCCH. For example, the SCI may include information indicating/representing whether the PSSCH is the last PSSCH transmission. For example, the information indicating/representing whether the PSSCH is the last PSSCH transmission may include a field related to whether the PSSCH is the last PSSCH transmission. For example, the receiving UE may determine that the PSSCH is the last PSSCH transmission based on the field value related to whether the PSSCH is the last PSSCH transmission set to 1. For example, the receiving UE may determine that the PSSCH is not the last PSSCH transmission based on the field value related to whether the PSSCH is the last PSSCH transmission set to 0.

In step S1220, the transmitting UE may transmit the PSSCH related to the PSCCH to the receiving UE. For example, the receiving UE may receive the PSSCH related to the PSCCH from the transmitting UE based on the active state. For example, the receiving UE may receive a sidelink MAC subheader related to the PSSCH from the transmitting UE. For example, the sidelink MAC subheader may include information indicating/representing whether the PSSCH is the last PSSCH transmission. For example, the information indicating/representing whether the PSSCH is the last PSSCH transmission may include a field related to whether the PSSCH is the last PSSCH transmission. For example, the receiving UE may determine that the PSSCH is the last PSSCH transmission based on the field value related to whether the PSSCH is the last PSSCH transmission set to 1. For example, the receiving UE may determine that the PSSCH is not the last PSSCH transmission based on the field value related to whether the PSSCH is the last PSSCH transmission set to 0.

In step S1230, the receiving UE may determine a PSFCH resource based on an index of a slot and an index of a sub-channel related to the PSSCH. For example, based on HARQ feedback being enabled, the receiving UE may determine the PSFCH resource based on the index of the slot and the index of the sub-channel related to the PSSCH. Or, for example, based on HARQ feedback being disabled, the receiving UE may omit/skip step S1230.

In step S1240, the receiving UE may transmit SL HARQ ACK to the transmitting UE through the PSFCH resource. For example, the receiving UE may transmit SL HARQ ACK to the transmitting UE through the PSFCH resource based on the active state. For example, based on HARQ feedback being enabled, the receiving UE may transmit SL HARQ ACK to the transmitting UE through the PSFCH resource. Or, for example, based on HARQ feedback being disabled, the receiving UE may not transmit SL HARQ ACK to the transmitting UE through the PSFCH resource.

In step S1250, based on that the receiving UE is informed that the PSSCH is the last PSSCH transmission, and based on that the receiving UE transmits SL HARQ ACK information through the PSFCH resource, the receiving UE may enter a sleep state. For example, based on the SCI including information indicating/representing that the PSSCH is the last PSSCH transmission, and based on that the receiving UE transmits SL HARQ ACK information through the PSFCH resource, the receiving UE may enter a sleep state. For example, based on the sidelink MAC subheader including information indicating/representing that the PSSCH is the last PSSCH transmission, and based on that the receiving UE transmits SL HARQ ACK information through the PSFCH resource, the receiving UE may enter a sleep state.

For example, the receiving UE may transit from the active state to the sleep state, based on the time at which SL HARQ ACK information is transmitted. For example, the receiving UE may stop the inactivity timer, if running, based on the time at which SL HARQ ACK information is transmitted. For example, while the inactivity timer is running, the receiving UE may be in an active state. For example, the receiving UE may be in a sleep state based on the expiration of the inactivity timer.

Or, for example, if HARQ feedback is disabled, the receiving UE may enter a sleep state based on the confirmation that the PSSCH is the last PSSCH transmission.

Figure 13:
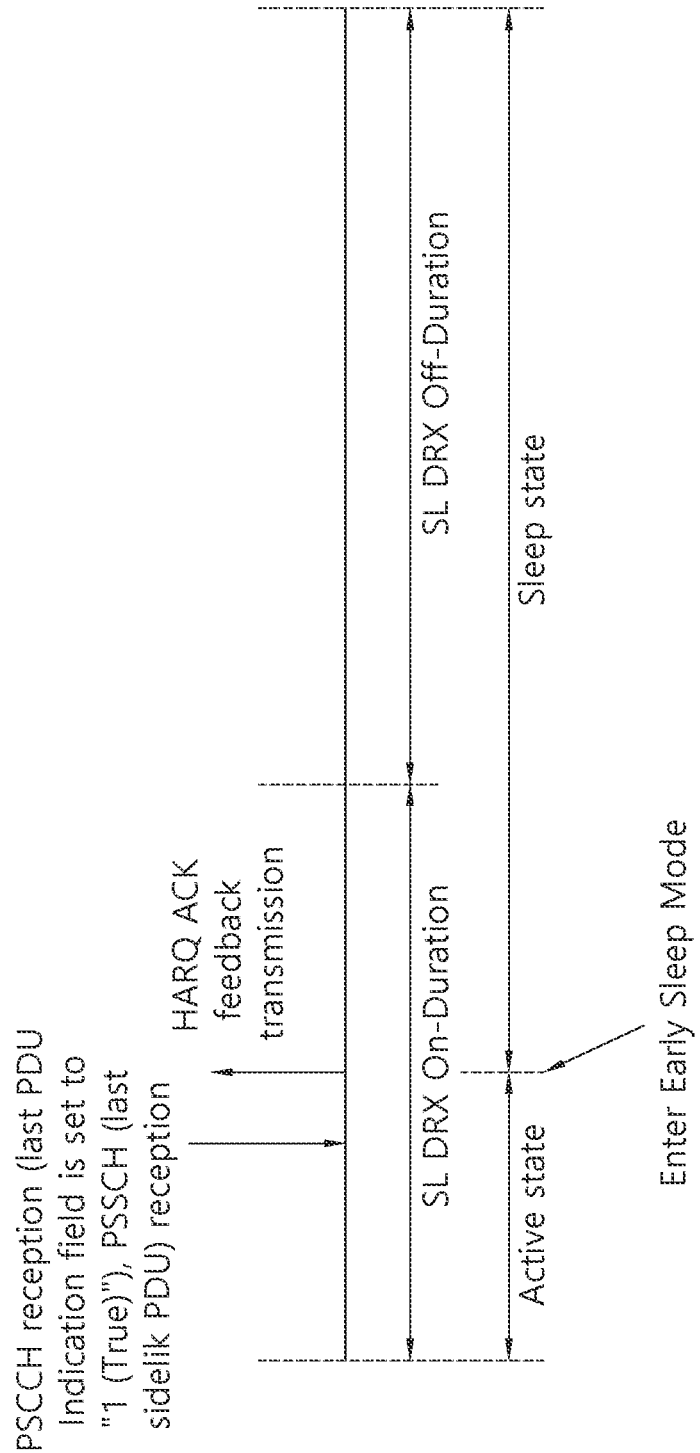
FIG. 13 shows an example of entering an early sleep state if the receiving UE confirms that the PSSCH for which HARQ feedback is enabled is the last PSSCH transmission, based on an embodiment of the present disclosure.
Figure 14:
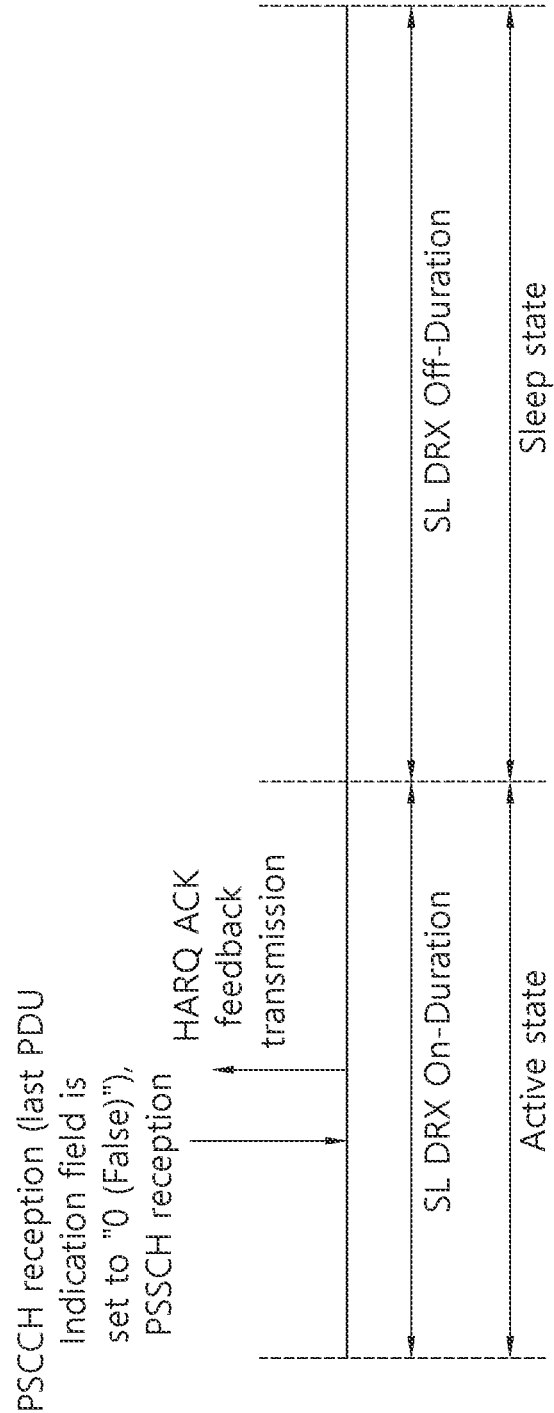
FIG. 14 shows an example of entering a sleep state if the receiving UE confirms that the PSSCH for which HARQ feedback is enabled is not the last PSSCH transmission, based on an embodiment of the present disclosure.

FIG. 13 shows an example of entering an early sleep state if the receiving UE confirms that the PSSCH for which HARQ feedback is enabled is the last PSSCH transmission, based on an embodiment of the present disclosure. FIG. 14 shows an example of entering a sleep state if the receiving UE confirms that the PSSCH for which HARQ feedback is enabled is not the last PSSCH transmission, based on an embodiment of the present disclosure. The embodiments of FIG. 13 and FIG. 14 may be combined with various embodiments of the present disclosure.

Referring to FIG. 13, the receiving UE may receive a PSCCH (e.g., SCI) related to a PSSCH (e.g., sidelink data) to be transmitted by the transmitting UE from the transmitting UE. For example, a field (e.g., last PDU indication) indicating/representing whether the PSSCH is the last PSSCH transmission, which is included in the PSCCH, may be set to a true value (e.g., 1), and HARQ feedback may be set to enable. In this case, the receiving UE may receive the last PSSCH transmitted by the transmitting UE, and the receiving UE may transmit SL HARQ ACK for the PSSCH to the transmitting UE. The receiving UE may transit to a sleep mode immediately after transmitting SL HARQ ACK to the transmitting UE.

Referring to FIG. 14, the receiving UE may receive a PSCCH (e.g., SCI) related to a PSSCH (e.g., sidelink data) to be transmitted by the transmitting UE from the transmitting UE. For example, a field indicating/representing whether the PSSCH is the last PSSCH transmission, which is included in the PSCCH, may be set to a false value (e.g., 1), and HARQ feedback may be set to enable. In this case, the receiving UE may receive the PSSCH which is not the last PSSCH from the transmitting UE, and the receiving UE may transmit SL HARQ ACK for the PSSCH to the transmitting UE. Thereafter, the receiving UE may be in an active mode during the remaining sidelink DRX on-duration period in order to monitor whether there is a PSCCH or a PSSCH to be transmitted next by the transmitting UE.

Figure 15:
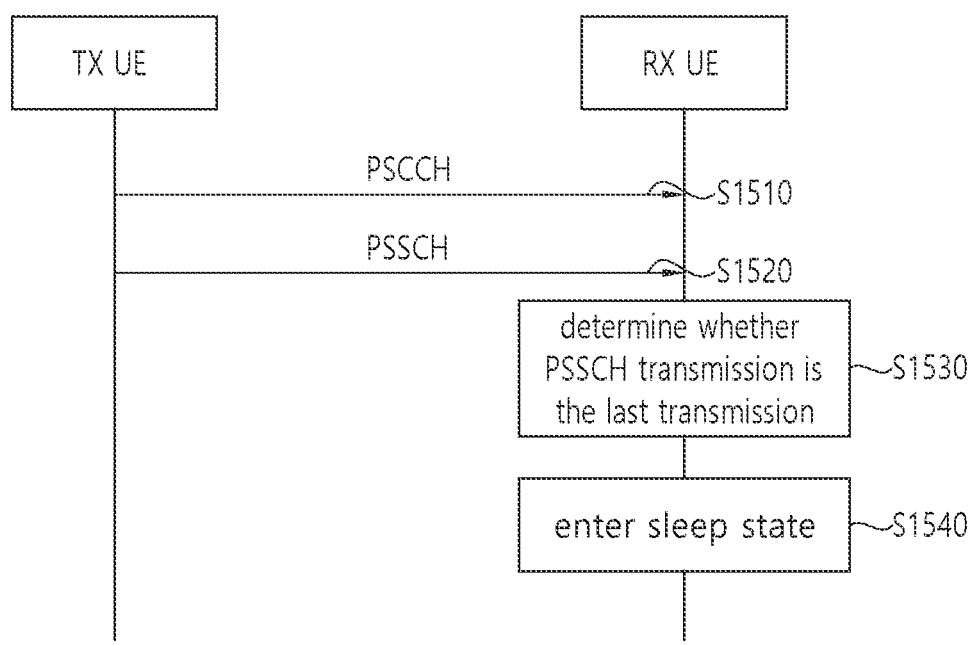
FIG. 15 shows a procedure for a receiving UE to enter an early sleep state if HARQ feedback is disabled, based on an embodiment of the present disclosure.

FIG. 15 shows a procedure for a receiving UE to enter an early sleep state if HARQ feedback is disabled, based on an embodiment of the present disclosure. The embodiment of FIG. 15 may be combined with various embodiments of the present disclosure.

Referring to FIG. 15, in step S1510, the transmitting UE may transmit a PSCCH to the receiving UE. For example, the receiving UE may receive the PSCCH from the transmitting UE based on an active state. For example, the receiving UE may receive SCI through the PSCCH or a PSSCH related to the PSCCH. For example, the SCI may include information indicating/representing whether the PSSCH is the last PSSCH transmission. For example, the information indicating/representing whether the PSSCH is the last PSSCH transmission may include a field related to whether the PSSCH is the last PSSCH transmission. For example, the active state may be a state in which the UE consumes power for monitoring traffic related to sidelink communication. For example, a sleep state may be a state in which the UE does not perform the monitoring by interrupting power related to the monitoring.

In step S1520, the transmitting UE may transmit the PSSCH related to the PSCCH to the receiving UE. For example, the receiving UE may receive the PSSCH related to the PSCCH from the transmitting UE based on the active state. For example, the receiving UE may receive a sidelink MAC subheader related to the PSSCH from the transmitting UE. For example, the sidelink MAC subheader may include information indicating/representing whether the PSSCH is the last PSSCH transmission. For example, the information indicating/representing whether the PSSCH is the last PSSCH transmission may include a field related to whether the PSSCH is the last PSSCH transmission.

In step S1530, the receiving UE may determine whether the PSSCH transmission is the last PSSCH transmission. For example, the receiving UE may determine that the PSSCH is the last PSSCH transmission based on the field value related to whether the PSSCH is the last PSSCH transmission set to 1. For example, the receiving UE may determine that the PSSCH is not the last PSSCH transmission based on the field value related to whether the PSSCH is the last PSSCH transmission set to 0.

In step S1540, the receiving UE may enter a sleep state based on the field value indicating/representing that the PSSCH is the last PSSCH transmission. For example, the receiving UE may enter a sleep state based on the SCI including information indicating/representing that the PSSCH is the last PSSCH transmission. For example, the receiving UE may enter a sleep state based on the sidelink MAC subheader including information indicating/representing that the PSSCH is the last PSSCH transmission.

For example, the receiving UE may transit from the active state to the sleep state, based on the time of checking the field value indicating/representing that the PSSCH is the last PSSCH transmission. For example, the receiving UE may stop the inactivity timer, if running, based on the time of checking the field value indicating/representing that the PSSCH is the last PSSCH transmission. For example, while the inactivity timer is running, the receiving UE may be in the active state. For example, the receiving UE may be in the sleep state based on the expiration of the inactivity timer.

Figure 16:
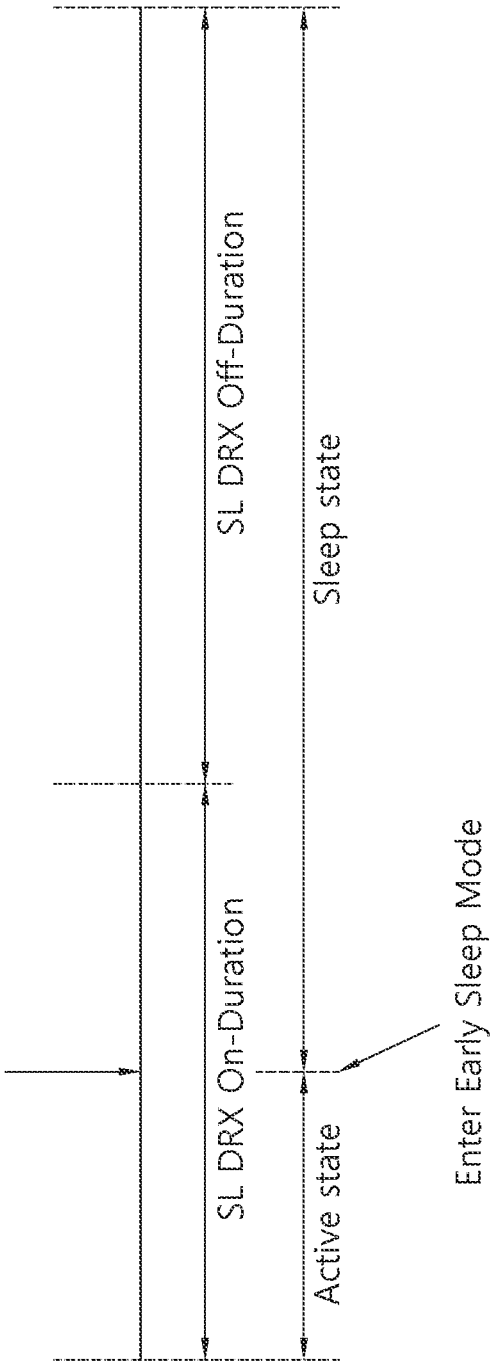
FIG. 16 shows an example of entering an early sleep state if the receiving UE determines that the PSSCH for which HARQ feedback is disabled is the last PSSCH transmission, based on an embodiment of the present disclosure.
Figure 17:
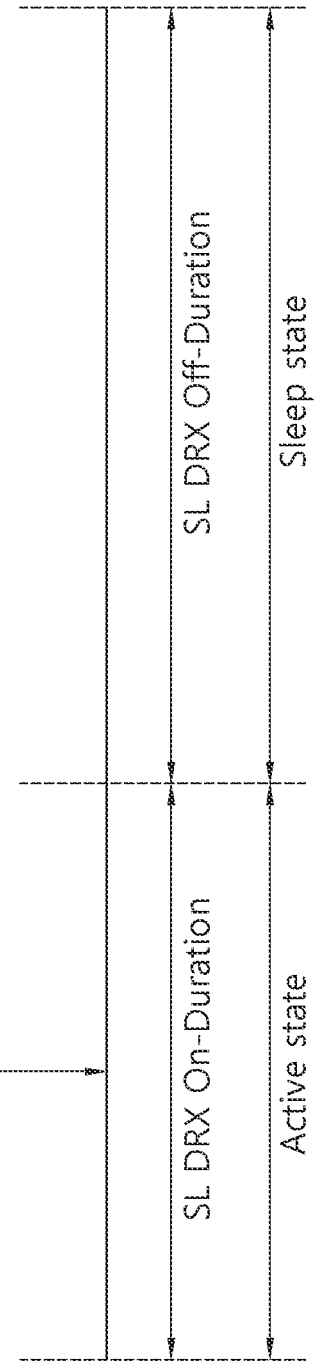
FIG. 17 shows an example of entering a sleep state if the receiving UE determines that the PSSCH for which HARQ feedback is disabled is not the last PSSCH transmission, based on an embodiment of the present disclosure.

FIG. 16 shows an example of entering an early sleep state if the receiving UE determines that the PSSCH for which HARQ feedback is disabled is the last PSSCH transmission, based on an embodiment of the present disclosure. FIG. 17 shows an example of entering a sleep state if the receiving UE determines that the PSSCH for which HARQ feedback is disabled is not the last PSSCH transmission, based on an embodiment of the present disclosure. The embodiments of FIG. 16 and FIG. 17 may be combined with various embodiments of the present disclosure.

Referring to FIG. 16, the receiving UE may receive a PSCCH (e.g., SCI) related to a PSSCH (e.g., sidelink data) to be transmitted by the transmitting UE from the transmitting UE. For example, a field (e.g., last PDU indication) indicating/representing whether the PSSCH is the last PSSCH transmission, which is included in the PSCCH, may be set to a true value (e.g., 1), and HARQ feedback may be set to disable. In this case, the receiving UE may transit to a sleep mode immediately after receiving the last PSSCH transmitted by the transmitting UE.

Referring to FIG. 17, the receiving UE may receive a PSCCH (e.g., SCI) related to a PSSCH (e.g., sidelink data) to be transmitted by the transmitting UE from the transmitting UE. For example, a field indicating/representing whether the PSSCH is the last PSSCH transmission, which is included in the PSCCH, may be set to a false value (e.g., 0), and HARQ feedback may be set to disable. In this case, the receiving UE may receive the PSSCH which is not the last PSSCH transmission from the transmitting UE. Thereafter, the receiving UE may be in an active mode during the remaining sidelink DRX on-duration period in order to monitor whether there is a PSCCH or a PSSCH to be transmitted next by the transmitting UE.

Various embodiments of the present disclosure may be applied to the following sidelink DRX timer(s).

For example, various embodiments of the present disclosure may be applied to the sidelink DRX onduration timer. For example, the sidelink DRX onduration timer may be a timer related to the duration in which the receiving UE performing the sidelink DRX operation should basically operate in an active time in order to receive PSCCH/PSSCH from the transmitting UE. Herein, for example, the active time may be a time during which the UE is in an active mode.

For example, various embodiments of the present disclosure may be applied to the sidelink DRX inactivity timer. For example, the sidelink DRX inactivity timer may be a timer related to the duration for extending the sidelink DRX onduration period. For example, the sidelink DRX duration period may be the duration in which the receiving UE performing the sidelink DRX operation should basically operate in an active time in order to receive PSCCH/PSSCH from the transmitting UE. That is, for example, the sidelink DRX onduration timer may be extended by the sidelink DRX inactivity timer period. Also, for example, if the receiving UE receives anew packet (e.g., new PSSCH) from the transmitting UE, the receiving UE may extend the sidelink DRX onduration timer by starting the sidelink DRX inactivity timer.

For example, various embodiments of the present disclosure may be applied to the sidelink DRX HARQ RTT timer. For example, the sidelink DRX HARQ RTT timer may be a timer for the duration during which the receiving UE performing the sidelink DRX operation is in a sleep mode until the receiving UE receives a retransmission packet or PSSCH assignment from the transmitting UE. That is, for example, if the sidelink DRX HARQ RTT timer starts, the receiving UE may determine that the transmitting UE does not transmit a sidelink retransmission packet until the sidelink DRX HARQ RTT timer expires, and the receiving UE may be in a sleep mode during the sidelink DRX HARQ RTT timer period.

For example, various embodiments of the present disclosure may be applied to the sidelink DRX retransmission timer. For example, the sidelink DRX retransmission timer may be a timer for the duration during which the receiving UE performing the sidelink DRX operation is in an active time to receive a retransmission packet or a PSSCH assignment from the transmitting UE. That is, for example, the receiving UE may monitor the reception of the sidelink packet or the PSSCH assignment during the sidelink DRX retransmission timer period.

In the following description, the names of timers (e.g., sidelink DRX onduration timer, sidelink DRX inactivity timer, sidelink DRX HARQ RTT timer, sidelink DRX retransmission timer, etc.) are only exemplary, and timers performing the same/similar function based on the description of each timer may be regarded as the same/similar timers regardless of its name.

The present disclosure can be applied to a method of solving a problem in which loss occurs due to interruption occurring during Uu BWP switching.

In addition, the present disclosure can be applied to a method of solving a problem in which loss occurs due to interruption occurring during sidelink BWP switching when the UE supports a plurality of sidelink multiple BWPs.

The present disclosure can also be applied/extended to the default/common sidelink DRX configuration, the default/common sidelink DRX pattern, parameter(s) included in the default/common sidelink DRX configuration, timer(s) related to the default/common sidelink DRX, the UE-pair specific sidelink DRX configuration, the UE-pair specific sidelink DRX pattern, parameter(s) included in the UE-pair specific sidelink DRX configuration, or timer(s) related to the UE-pair specific sidelink DRX.

In the present disclosure, the term "onduration" may refer to an active time (e.g., a wake-up state to receive/transmit a wireless signal) period. For example, the wake-up state may be a state in which the RF module is "on". In addition, the term "off duration" may refer to a sleep time (e.g., a sleep mode state for power saving) period. For example, the sleep mode state may be a state in which the RF module is "off". For example, the transmitting UE may not be obligated to operate in the sleep mode in the sleep time period. For example, even in the sleep time period, if necessary, the transmitting terminal may operate in the active time for a moment for the sensing operation/transmission operation.

Whether the proposed method/rule of the present disclosure is applied may be configured specifically or independently based on a resource pool, a congestion level, a service priority, a service type, a QoS requirement (e.g., latency, reliability), PQI, a traffic type (e.g., periodic generation or aperiodic generation), a sidelink transmission resource allocation mode (e.g., mode 1 or mode 2), etc.

The parameter (e.g., a threshold value) related to whether the proposed method/rule of the present disclosure is applied may be configured specifically or independently based on a resource pool, a congestion level, a service priority, a service type, a QoS requirement (e.g., latency, reliability), PQI, a traffic type (e.g., periodic generation or aperiodic generation), a sidelink transmission resource allocation mode (e.g., mode 1 or mode 2), etc.

For example, whether the proposal/rule of the present disclosure is applied may be configured specifically or independently based on at least one of a resource pool, a type of service/packet, a priority of service/packet, a QoS requirement (e.g., URLLC/EMBB traffic, reliability, latency), PQI, a cast type (e.g., unicast, groupcast, broadcast), a congestion level (e.g., CBR), sidelink HARQ feedback scheme (e.g., HARQ feedback reporting only NACK. HARQ feedback reporting ACK/NACK), HARQ feedback enabled MAC PDU transmission. HARQ feedback disabled MAC PDU transmission, whether or not PUCCH-based sidelink HARQ feedback reporting operation is configured, performing pre-emption, performing re-evaluation, reselecting resources based on re-evaluation, a L1/L2 source ID, a L1/L2 destination ID, a combination of L1/L2 source layer ID and L1/L2 destination layer ID, an identifier related to the combination of L1/L2 source layer ID and L1/L2 destination layer ID, a combination of a pair of L1/L2 source layer ID and L1/L2 destination layer ID and a cast type, an identifier related to the combination of the pair of L1/L2 source layer ID and L1/L2 destination layer ID and the cast type, a direction related to the combination of L1/L2 source layer ID and L1/L2 destination layer ID, a PC5 RRC connection/link, performing sidelink DRX, sidelink mode type (e.g., resource allocation mode 1 or resource allocation mode 2), periodic resource reservation, or aperiodic resource reservation.

The parameter or parameter configuration value related to whether the proposal/rule of the present disclosure is applied may be configured specifically or independently based on at least one of a resource pool, a type of service/packet, a priority of service/packet, a QoS requirement (e.g., URLLC/EMBB traffic, reliability, latency), PQI, a cast type (e.g., unicast, groupcast, broadcast), a congestion level (e.g.. CBR), sidelink HARQ feedback scheme (e.g., HARQ feedback reporting only NACK, HARQ feedback reporting ACK/NACK). HARQ feedback enabled MAC PDU transmission, HARQ feedback disabled MAC PDU transmission, whether or not PUCCH-based sidelink HARQ feedback reporting operation is configured, performing pre-emption, performing re-evaluation, reselecting resources based on re-evaluation, a L1/L2 source ID, a L1/L2 destination ID, a combination of L1/L2 source layer ID and L1/L2 destination layer ID, an identifier related to the combination of L1,12 source layer ID and L1/L2 destination layer ID, a combination of a pair of L1/L2 source layer ID and L1/L2 destination layer ID and a cast type, an identifier related to the combination of the pair of L1/L2 source layer ID and L1/L2 destination layer ID and the cast type, a direction related to the combination of L1/L2 source layer ID and L1/L2 destination layer ID, a PC5 RRC connection/link, performing sidelink DRX, sidelink mode type (e.g., resource allocation mode 1 or resource allocation mode 2), periodic resource reservation, or aperiodic resource reservation.

The term "predetermined time" mentioned in the present disclosure may refer to a time during which the receiving UE is in an active time for a pre-configured time in order to receive a sidelink signal or sidelink data from the transmitting UE. Or, the term "predetermined time" mentioned in the present disclosure may refer to a time during which the receiving UE is in an active time for a specific timer (e.g., a sidelink DRX retransmission timer, a sidelink DRX inactivity timer, or a timer guaranteeing to operate as an active time in the DRX operation of the receiving UE) time in order to receive a sidelink signal or sidelink data from the transmitting UE.

In addition, whether the proposal and the proposal rule of the present disclosure are applied may be also applied to a millimeter wave (mmWave) sidelink operation. For example, the parameter configuration value related to whether the proposal and the proposal rule of the present disclosure are applied may also be applied to a millimeter wave (mmWave) sidelink operation.

Based on various embodiments of the present disclosure, the receiving UE operating in sidelink DRX may receive the PSCCH and the PSSCH related to the PSCCH from the transmitting UE, and may operate in an early sleep mode. Due to this, the receiving UE can obtain an additional power saving gain.

Figure 18:
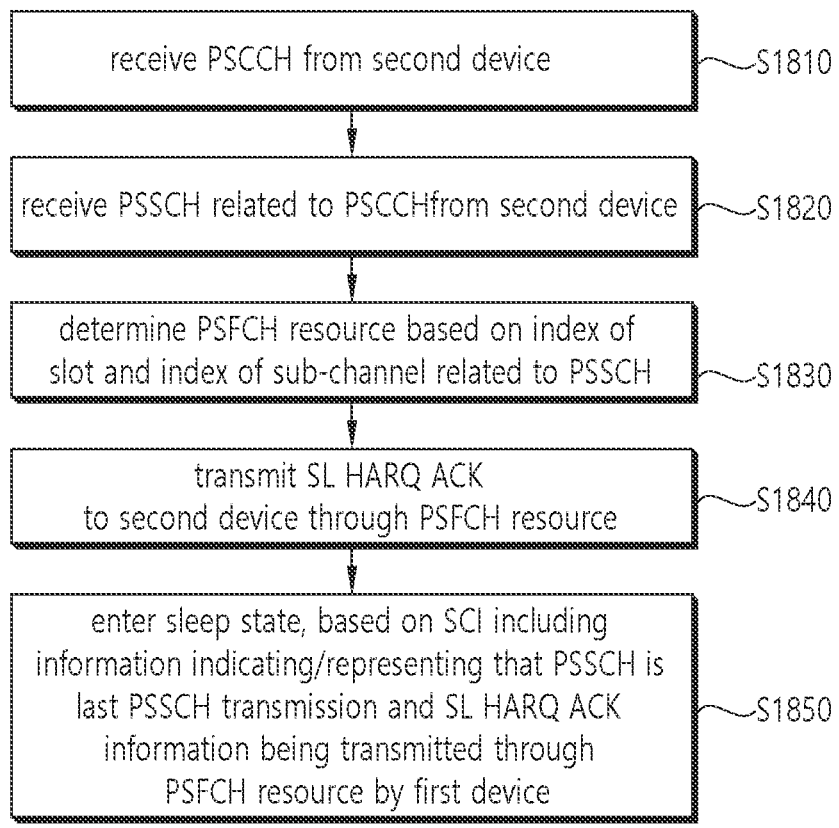
FIG. 18 shows a method for a first device to enter a sleep state based on information indicating/representing whether a PSSCH is the last PSSCH transmission, based on an embodiment of the present disclosure.

FIG. 18 shows a method for a first device to enter a sleep state based on information indicating/representing whether a PSSCH is the last PSSCH transmission, based on an embodiment of the present disclosure. The embodiment of FIG. 18 may be combined with various embodiments of the present disclosure.

Referring to FIG. 18, in step S1810, the first device 100 may receive a PSCCH from the second device 200. For example, the first device 100 may receive the PSCCH from the second device 200 based on an active state. For example, the active state may be a state in which the first device 100 consumes power for monitoring traffic related to sidelink communication. For example, the sleep state may be a state in which the first device 100 does not perform the monitoring by interrupting power related to the monitoring. For example, the first device 100 may receive SCI through the PSCCH or a PSSCH related to the PSCCH. For example, the SCI may include information indicating/representing whether the PSSCH is the last PSSCH transmission. For example, the information indicating/representing whether the PSSCH is the last PSSCH transmission may include a field related to whether the PSSCH is the last PSSCH transmission. For example, the first device 100 may determine that the PSSCH is the last PSSCH transmission, based on a value of the field related to whether the PSSCH is the last PSSCH transmission set to 1. For example, the first device 100 may determine that the PSSCH is not the last PSSCH transmission, based on a value of the field related to whether the PSSCH is the last PSSCH transmission set to 0.

In step S1820, the first device 100 may receive the PSSCH related to the PSCCH from the second device 200. For example, the first device 100 may receive the PSSCH related to the PSCCH from the second device 200 based on the active state.

In step S1830, the first device 100 may determine a PSFCH resource based on an index of a slot and an index of a sub-channel related to the PSSCH. For example, based on HARQ feedback being enabled, the first device 100 may determine the PSFCH resource based on the index of the slot and the index of the sub-channel related to the PSSCH. Or, for example, based on HARQ feedback being disabled, the first device 100 may omit/skip step S1830.

In step S1840, the first device 100 may transmit SL HARQ ACK to the second device 200 through the PSFCH resource. For example, the first device 100 may transmit SL HARQ ACK to the second device 200 through the PSFCH resource based on the active state. For example, based on HARQ feedback being enabled, the first device 100 may transmit SL HARQ ACK to the second device 200 through the PSFCH resource. Or, for example, based on HARQ feedback being disabled, the first device 100 may not transmit SL HARQ ACK to the second device 200 through the PSFCH resource.

In step S1850, the first device 100 may enter the sleep state, based on the SCI including information indicating/representing that the PSSCH is the last PSSCH transmission and the SL HARQ ACK information being transmitted through the PSFCH resource by the first device 100.

For example, the first device 100 may transit from the active state to the sleep state, based on the time when the SL HARQ ACK information is transmitted. For example, the first device 100 may stop an inactivity timer which is running, based on the time when the SL HARQ ACK information is transmitted. For example, while the inactivity timer is running, the first device 100 may be in the active state. For example, the first device 100 may be in the sleep state based on the inactivity timer being stopped.

Or, for example, if HARQ feedback is disabled, the first device 100 may enter the sleep state based on the confirmation that the PSSCH is the last PSSCH transmission.

The above-described embodiment(s) can be applied to various device(s) to be described below. For example, the processor 102 of the first device 100 may control the transceiver 106 to receive the PSCCH from the second device 200. In addition, the processor 102 of the first device 100 may control the transceiver 106 to receive the PSSCH related to the PSCCH from the second device 200. In addition, the processor 102 of the first device 100 may determine the PSFCH resource based on the index of the slot and the index of the sub-channel related to the PSSCH. In addition, the processor 102 of the first device 100 may control the transceiver 106 to transmit SL HARQ ACK to the second device 200 through the PSFCH resource. In addition, the processor 102 of the first device 100 may enter the sleep state, based on the SCI including information indicating/representing that the PSSCH is the last PSSCH transmission and the SL HARQ ACK information being transmitted through the PSFCH resource by the first device 100.

Based on an embodiment of the present disclosure, a first device adapted to perform wireless communication may be provided. For example, the first device may comprise: one or more memories storing instructions: one or more transceivers; and one or more processors connected to the one or more memories and the one or more transceivers. For example, the one or more processors may execute the instructions to: receive, from a second device, a physical sidelink control channel (PSCCH); receive, from the second device, a physical sidelink shared channel (PSSCH) related to the PSCCH, wherein sidelink control information (SCI) is received through the PSCCH or the PSSCH related to the PSCCH, and wherein the SCI includes information representing whether the PSSCH is a last PSSCH transmission; determine a PSFCH resource based on an index of a slot and an index of a sub-channel related to the PSSCH; transmit, to the second device, SL HARQ ACK information through the PSFCH resource; and enter a sleep state, based on the SCI including information representing that the PSSCH is the last PSSCH transmission and the SL HARQ ACK information being transmitted through the PSFCH resource by the first device.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, from a second UE, a physical sidelink control channel (PSCCH); receive, from the second UE, a physical sidelink shared channel (PSSCH) related to the PSCCH, wherein sidelink control information (SCI) is received through the PSCCH or the PSSCH related to the PSCCH, and wherein the SCI includes information representing whether the PSSCH is a last PSSCH transmission: determine a PSFCH resource based on an index of a slot and an index of a sub-channel related to the PSSCH; transmit, to the second UE, SL HARQ ACK information through the PSFCH resource; and enter a sleep state, based on the SCI including information representing that the PSSCH is the last PSSCH transmission and the SL HARQ ACK information being transmitted through the PSFCH resource by the first UE.

Based on an embodiment of the present disclosure, a non-transitory computer-readable storage medium storing instructions may be provided, For example, the instructions, when executed, may cause a first device to: receive, from a second device, a physical sidelink control channel (PSCCH); receive, from the second device, a physical sidelink shared channel (PSSCH) related to the PSCCH, wherein sidelink control information (SCI) is received through the PSCCH or the PSSCH related to the PSCCH, and wherein the SCI includes information representing whether the PSSCH is a last PSSCH transmission; determine a PSFCH resource based on an index of a slot and an index of a sub-channel related to the PSSCH; transmit, to the second device, SL HARQ ACK information through the PSFCH resource; and enter a sleep state, based on the SCI including information representing that the PSSCH is the last PSSCH transmission and the SL HARQ ACK information being transmitted through the PSFCH resource by the first device.

Figure 19:
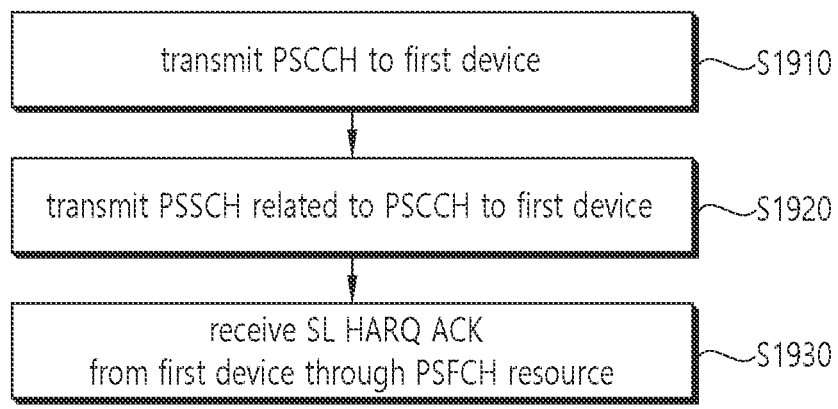
FIG. 19 shows a method for a second device to transmit information indicating/representing whether a PSSCH is the last PSSCH transmission to a first device, based on an embodiment of the present disclosure.

FIG. 19 shows a method for a second device to transmit information indicating/representing whether a PSSCH is the last PSSCH transmission to a first device, based on an embodiment of the present disclosure. The embodiment of FIG. 19 may be combined with various embodiments of the present disclosure.

Referring to FIG. 19, in step S1910, the second device 200 may transmit a PSCCH to the first device 100. For example, the second device 200 may transmit the PSCCH to the first device 100 based on an active state. For example, the active state may be a state in which power is consumed for monitoring traffic related to sidelink communication. For example, a sleep state may be a state in which the monitoring is not performed by interrupting power related to the monitoring. For example, the second device 200 may transmit SCI to the first device 100 through the PSCCH or a PSSCH related to the PSCCH. For example, the SCI may include information indicating/representing whether the PSSCH is the last PSSCH transmission. For example, the information indicating/representing whether the PSSCH is the last PSSCH transmission may include a field related to whether the PSSCH is the last PSSCH transmission. For example, the first device 100 may determine that the PSSCH is the last PSSCH transmission, based on a value of the field related to whether the PSSCH is the last PSSCH transmission set to 1. For example, the first device 100 may determine that the PSSCH is not the last PSSCH transmission, based on a value of the field related to whether the PSSCH is the last PSSCH transmission set to 0.

In step S1920, the second device 200 may transmit the PSSCH related to the PSCCH to the first device 100. For example, the second device 200 may transmit the PSSCH related to the PSCCH to the first device 100 based on the active state.

In step S1930, the second device 200 may receive SL HARQ ACK from the first device 100 through a PSFCH resource. For example, the second device 200 may receive SL HARQ ACK from the first device 100 through the PSFCH resource based on the active state. For example, the PSFCH resource may be determined based on an index of a slot and an index of a sub-channel related to the PSSCH. For example, based on HARQ feedback being enabled, the PSFCH resource may be determined based on the index of the slot and the index of the sub-channel related to the PSSCH. Or, for example, based on HARQ feedback being disabled, step S1930 may be omitted/skipped. For example, based on HARQ feedback being enabled, the second device 200 may receive SL HARQ ACK from the first device 100 through the PSFCH resource. Or, for example, based on HARQ feedback being disabled, the second device 200 may not receive SL HARQ ACK from the first device 100 through the PSFCH resource.

For example, the first device 100 may transit to the sleep state, based on the SCI including information indicating/representing that the PSSCH is the last PSSCH transmission and the SL HARQ ACK information being transmitted through the PSFCH resource by the first device 100.

For example, the second device 200 may transit from the active state to the sleep state, based on the time when SL HARQ ACK information is received. For example, the second device 200 may stop an inactivity timer which is running, based on the time when SL HARQ ACK information is received. For example, while the inactivity timer is running, the second device 200 may be in the active state. For example, the second device 200 may be in the sleep state based on the inactivity timer being stopped.

Or, for example, if HARQ feedback is disabled, the first device 100 may transit to the sleep state based on the confirmation that the PSSCH is the last PSSCH transmission. For example, if HARQ feedback is disabled, the second device 200 may transit to the sleep state based on the last PSSCH transmission.

The above-described embodiment(s) can be applied to various device(s) to be described below. For example, the processor 202 of the second device 100 may control the transceiver 206 to transmit the PSCCH to the first device 100. In addition, the processor 202 of the second device 200 may control the transceiver 206 to transmit the PSSCH related to the PSCCH to the first device 100. In addition, the processor 202 of the second device 200 may control the transceiver 206 to receive SL HARQ ACK from the first device 100 through the PSFCH resource.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a physical sidelink control channel (PSCCH); transmit, to the first device, a physical sidelink shared channel (PSSCH) related to the PSCCH, wherein sidelink control information (SCI) is transmitted through the PSCCH or the PSSCH related to the PSCCH, and wherein the SCI includes information representing whether the PSSCH is a last PSSCH transmission; and receive, from the first device, SL HARQ ACK information through a PSFCH resource, wherein the PSFCH resource is determined based on an index of a slot and an index of a sub-channel related to the PSSCH, and wherein, based on the SCI including information representing that the PSSCH is the last PSSCH transmission and the SL HARQ ACK information being transmitted through the PSFCH resource by the first device, the first device transits to a sleep state.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
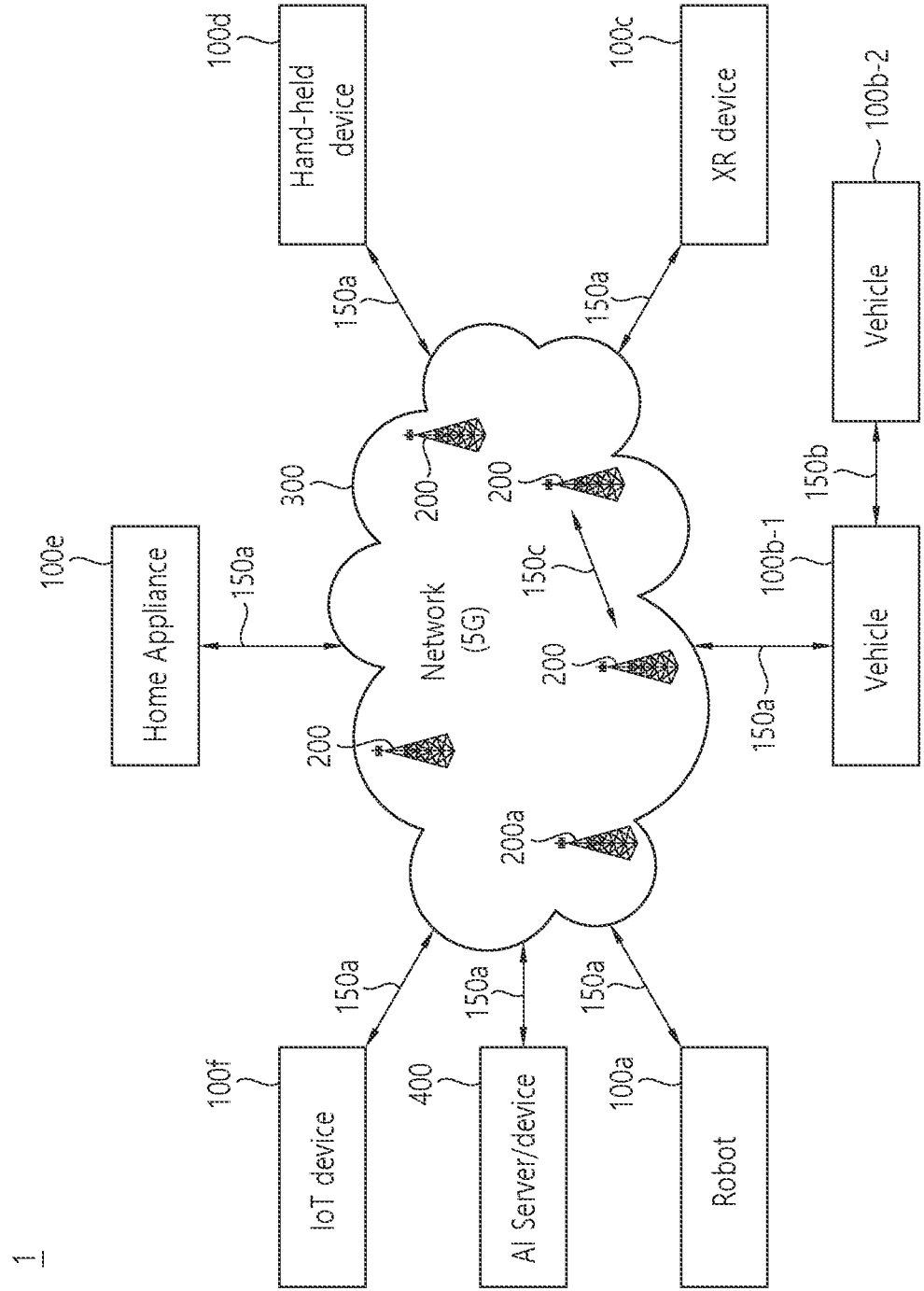
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR) Nirtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC. 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the Ai server 400 via the network 300. The network 300 may be configured using a 3G network, a 4G (e.g.. LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
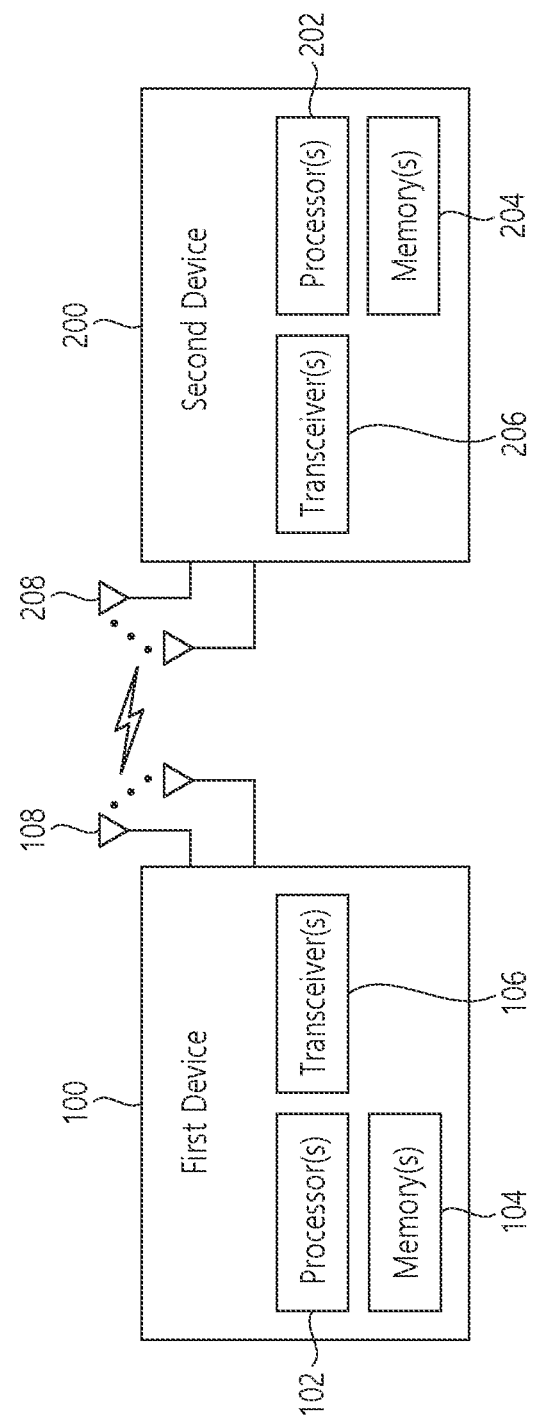
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x)} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s)206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
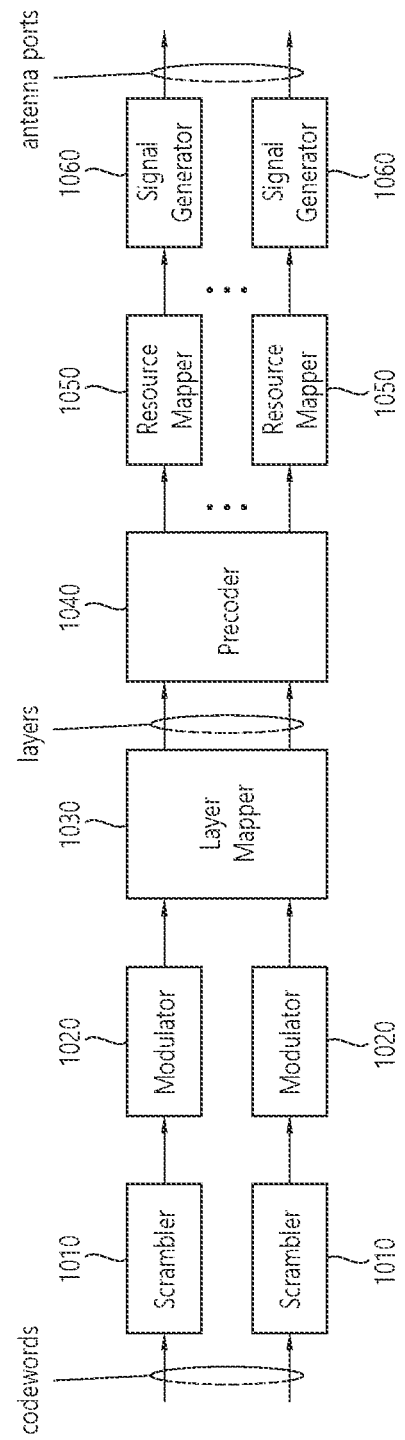
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g.. DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs). CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
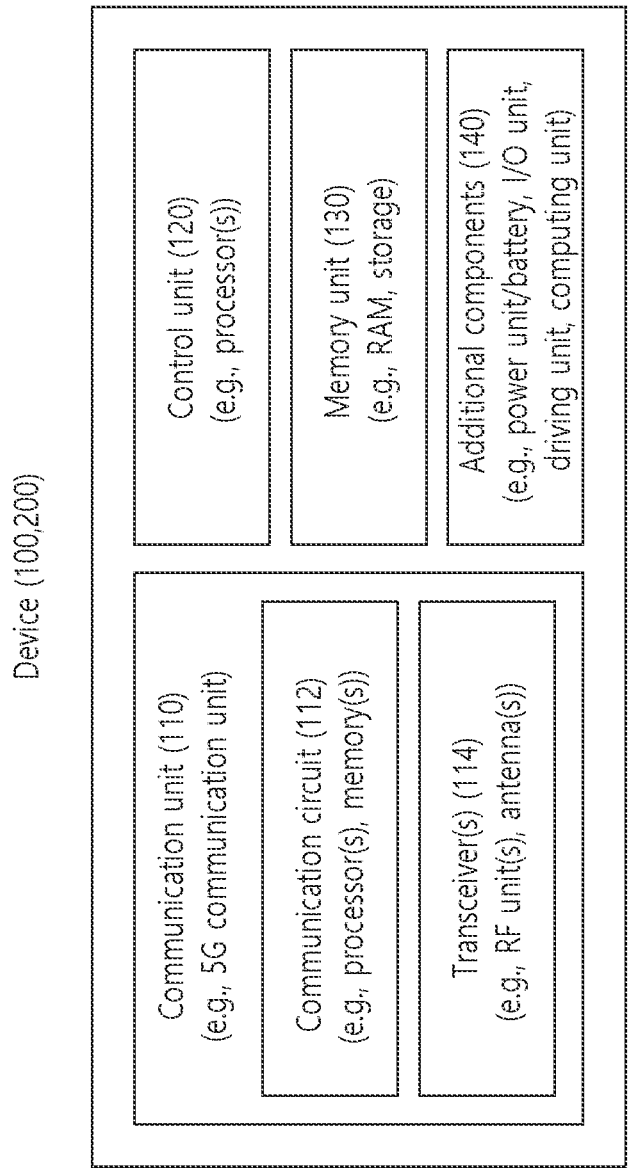
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use—example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
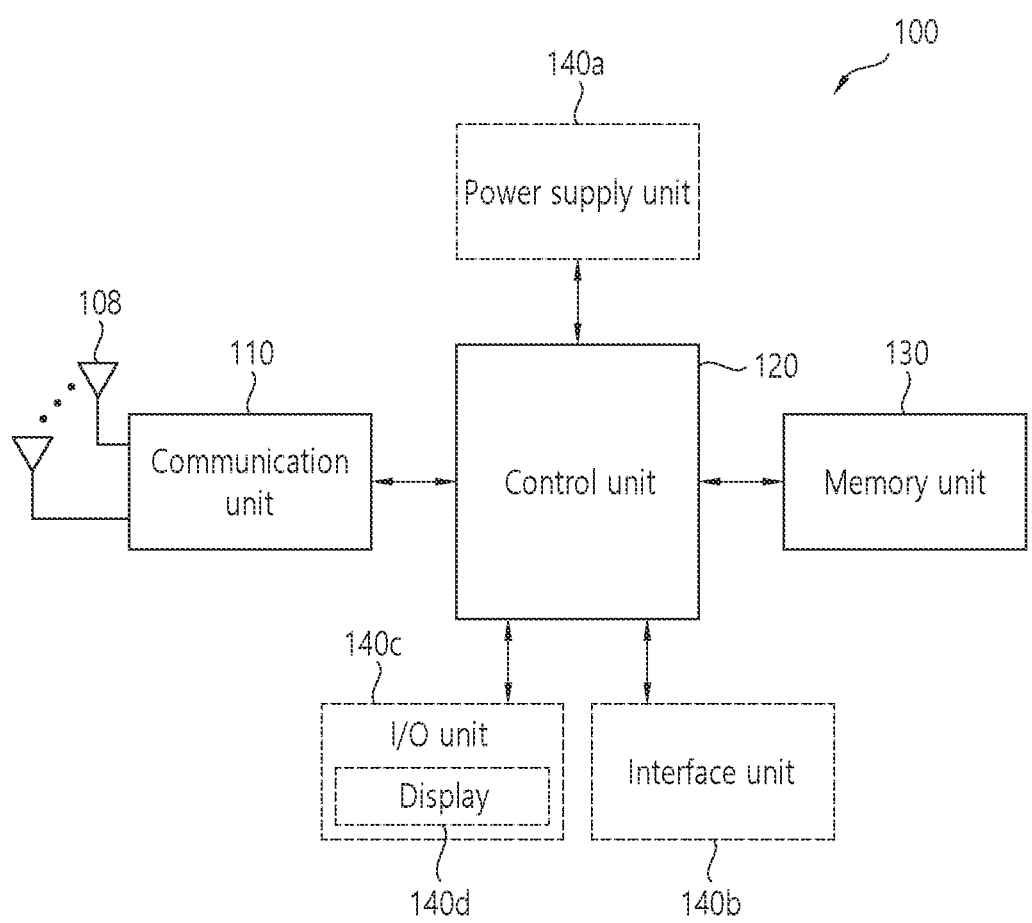
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 25:
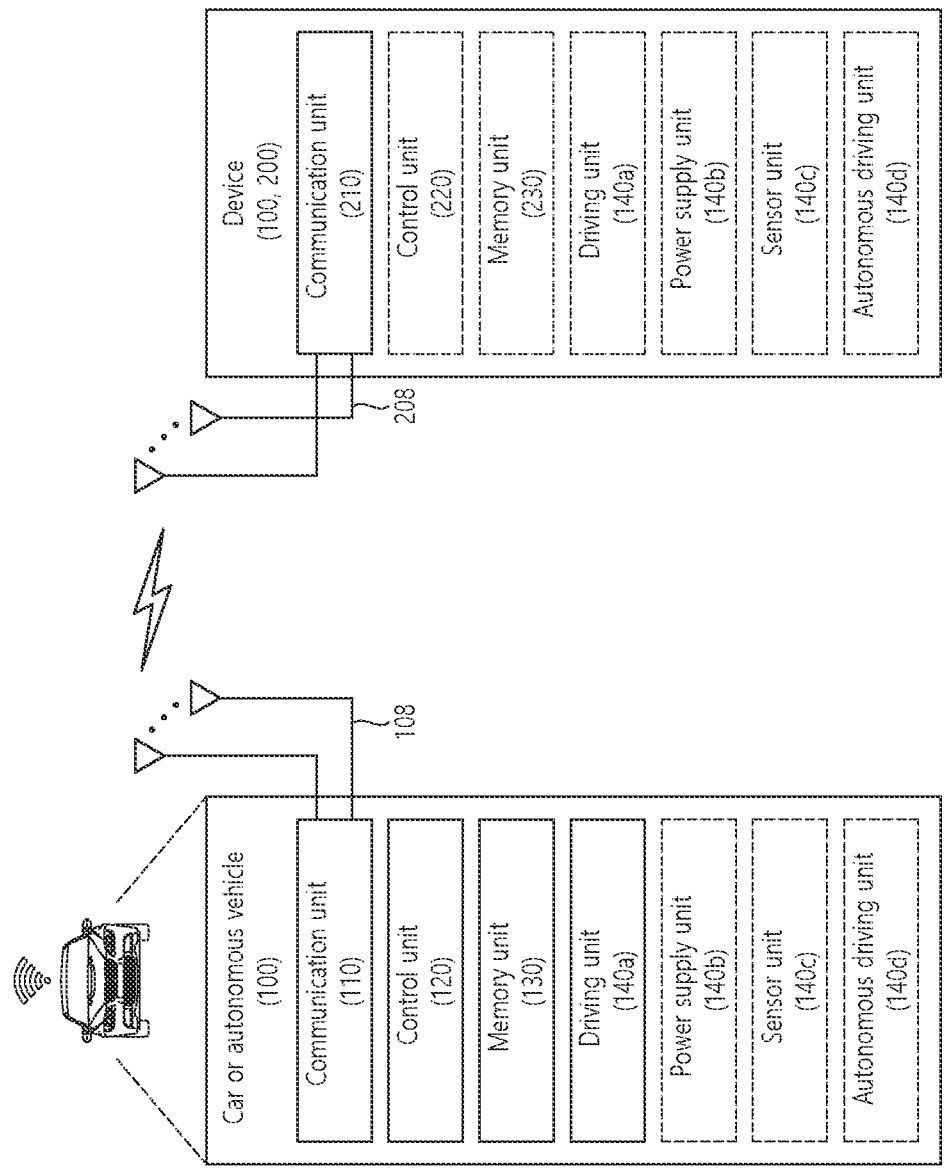
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
receiving, from a second device, a physical sidelink control channel (PSCCH);
receiving, from the second device, a physical sidelink shared channel (PSSCH) related to the PSCCH,
wherein sidelink control information (SCI) is received through the PSCCH or the PSSCH related to the PSCCH, and
wherein the SCI includes information representing whether the PSSCH is a last PSSCH transmission;
determining a physical sidelink feedback channel (PSFCH) resource based on an index of a slot and an index of a sub-channel related to the PSSCH;
transmitting, to the second device, sidelink (SL) hybrid automatic repeat request (HARQ) acknowledgment (ACK) information through the PSFCH resource; and
entering a sleep state, based on the SCI including information representing that the PSSCH is the last PSSCH transmission and the SL HARQ ACK information being transmitted through the PSFCH resource by the first device.

2. The method of claim 1, wherein an active state is a state in which power is consumed for monitoring traffic related to sidelink communication, and
wherein the sleep state is a state in which the monitoring is not performed by interrupting power related to the monitoring.

3. The method of claim 2, wherein, based on the first device being in the active state, the PSCCH and the PSSCH related to the PSCCH are received and the SL HARQ ACK information is transmitted.

4. The method of claim 2, wherein, based on a time when the SL HARQ ACK information is transmitted, the first device transits from the active state to the sleep state.

5. The method of claim 1, wherein the information representing whether the PSSCH is the last PSSCH transmission includes a field related to whether the PSSCH is the last PSSCH transmission.

6. The method of claim 5, wherein the first device determines that the PSSCH is the last PSSCH transmission based on a value of the field related to whether the PSSCH is the last PSSCH transmission set to 1.

7. The method of claim 5, wherein the first device determines that the PSSCH is not the last PSSCH transmission based on a value of the field related to whether the PSSCH is the last PSSCH transmission set to 0.

8. The method of claim 2, wherein, based on a time when the SL HARQ ACK information is transmitted, an inactivity timer which is running stops.

9. The method of claim 8, wherein the first device is in the active state while the inactivity timer is running.

10. The method of claim 8, wherein the first device is in the sleep state based on the inactivity timer being stopped.

11. The method of claim 1, wherein the SL HARQ ACK information is transmitted to the second device based on HARQ feedback being enabled.

12. The method of claim 1, wherein the SL HARQ ACK information is not transmitted to the second device based on HARQ feedback being disabled.

13. The method of claim 12, wherein the first device enters the sleep state based on a confirmation that the PSSCH is the last PSSCH transmission.

14. A first device adapted to perform wireless communication, the first device comprising:
one or more memories storing instructions;
one or more transceivers; and
one or more processors connected to the one or more memories and the one or more transceivers, wherein the one or more processors execute the instructions to:
control the one or more transceivers to receive, from a second device, a physical sidelink control channel (PSCCH);
control the one or more transceivers to receive, from the second device, a physical sidelink shared channel (PSSCH) related to the PSCCH,
wherein sidelink control information (SCI) is received through the PSCCH or the PSSCH related to the PSCCH, and
wherein the SCI includes information representing whether the PSSCH is a last PSSCH transmission;

determine a physical sidelink feedback channel (PSFCH) resource based on an index of a slot and an index of a sub-channel related to the PSSCH;
control the one or more transceivers to transmit, to the second device, sidelink (SL) hybrid automatic repeat request (HARQ) acknowledgment (ACK) information through the PSFCH resource; and
enter a sleep state, based on the SCI including information representing that the PSSCH is the last PSSCH transmission and the SL HARQ ACK information being transmitted through the PSFCH resource by the first device.

15. The first device of claim 14, wherein an active state is a state in which power is consumed for monitoring traffic related to sidelink communication, and
wherein the sleep state is a state in which the monitoring is not performed by interrupting power related to the monitoring.

16. The first device of claim 15, wherein, based on the first device being in the active state, the PSCCH and the PSSCH related to the PSCCH are received and the SL HARQ ACK information is transmitted.

17. The first device of claim 15, wherein, based on a time when the SL HARQ ACK information is transmitted, the first device transits from the active state to the sleep state.

18. The first device of claim 14, wherein the information representing whether the PSSCH is the last PSSCH transmission includes a field related to whether the PSSCH is the last PSSCH transmission.

19. The first device of claim 18, wherein the first device determines that the PSSCH is the last PSSCH transmission based on a value of the field related to whether the PSSCH is the last PSSCH transmission set to 1.

20. A processing device adapted to control a first device, the processing device comprising:
one or more processors; and
one or more memories operably connected to the one or more processors and storing instructions, wherein the one or more processors execute the instructions to:
receive, from a second device, a physical sidelink control channel (PSCCH);
receive, from the second device, a physical sidelink shared channel (PSSCH) related to the PSCCH,
wherein sidelink control information (SCI) is received through the PSCCH or the PSSCH related to the PSCCH, and
wherein the SCI includes information representing whether the PSSCH is a last PSSCH transmission;
determine a physical sidelink feedback channel (PSFCH) resource based on an index of a slot and an index of a sub-channel related to the PSSCH;
transmit, to the second device, sidelink (SL) hybrid automatic repeat request (HARQ) acknowledgment (ACK) information through the PSFCH resource; and
enter a sleep state, based on the SCI including information representing that the PSSCH is the last PSSCH transmission and the SL HARQ ACK information being transmitted through the PSFCH resource by the first device.

* * * * *